(12) United States Patent
Kim et al.

(10) Patent No.: US 12,078,826 B2
(45) Date of Patent: Sep. 3, 2024

(54) WINDOW MEMBER, DISPLAY DEVICE, AND METHOD OF MANUFACTURING DISPLAY DEVICE

(71) Applicant: Samsung Display Co., Ltd., Yongin-si (KR)

(72) Inventors: Sang Hoon Kim, Hwaseong-si (KR); Min Sang Koo, Seongnam-si (KR); Kyung Man Kim, Anyang-si (KR); Yu Ri Kim, Guri-si (KR); Min Hoon Choi, Seoul (KR); Seong Jin Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 312 days.

(21) Appl. No.: 17/449,869

(22) Filed: Oct. 4, 2021

(65) Prior Publication Data

US 2022/0107448 A1 Apr. 7, 2022

(30) Foreign Application Priority Data

Oct. 6, 2020 (KR) .................. 10-2020-0128863

(51) Int. Cl.
| | | |
|---|---|---|
| *G02B 5/18* | (2006.01) | |
| *B32B 3/30* | (2006.01) | |
| *B32B 7/023* | (2019.01) | |
| *G02B 1/00* | (2006.01) | |
| *G06F 1/16* | (2006.01) | |

(52) U.S. Cl.
CPC .............. *G02B 5/1814* (2013.01); *B32B 3/30* (2013.01); *B32B 7/023* (2019.01); *G02B 1/002* (2013.01); *G02B 5/1847* (2013.01); *G06F 1/1652* (2013.01); *B32B 2307/418* (2013.01); *B32B 2457/20* (2013.01)

(58) Field of Classification Search
CPC .... G02B 5/1814; G02B 5/1847; G02B 1/002; G06F 1/1652
USPC ......................................................... 428/212
See application file for complete search history.

(56) References Cited

U.S. PATENT DOCUMENTS

| | | | |
|---|---|---|---|
| 9,354,476 B2 | 5/2016 | Han et al. | |
| 10,020,462 B1* | 7/2018 | Ai | .......................... H10K 50/841 |
| 2015/0043174 A1* | 2/2015 | Han | ..................... G02F 1/13452 |
| | | | 428/156 |
| 2017/0069808 A1* | 3/2017 | Kim | ................... H10K 50/8426 |
| 2018/0150108 A1* | 5/2018 | Song | ..................... G06F 1/1677 |

FOREIGN PATENT DOCUMENTS

| | | |
|---|---|---|
| KR | 10-2008-0096158 A | 10/2008 |
| KR | 10-2013-0132950 A | 12/2013 |
| KR | 10-2018-0079093 A | 7/2018 |

* cited by examiner

*Primary Examiner* — Tahseen Khan
(74) *Attorney, Agent, or Firm* — Lewis Roca Rothgerber Christie LLP

(57) ABSTRACT

Provided is a display device including a display panel, and a window member on the display panel, wherein the window member includes a window base material including a flexible portion in which a first area having a first rigidity and a second area having second rigidity that is less than the first rigidity are alternately located, a buffer layer on the window base material and having a refractive index that is smaller than a refractive index of the window base material, and a filler layer on the buffer layer and having a refractive index that is smaller than the refractive index of the buffer layer.

20 Claims, 15 Drawing Sheets

WINDOW MEMBER, DISPLAY DEVICE, AND METHOD OF MANUFACTURING DISPLAY DEVICE

CROSS-REFERENCE TO RELATED APPLICATION

This application claims priority to and the benefit of Korean Patent Application No. 10-2020-0128863, filed on Oct. 6, 2020, the entire content of which is hereby incorporated by reference.

BACKGROUND

1. Field

The present disclosure relates to a window member, a display device, and a method of manufacturing the display device.

2. Description of the Related Art

With the development of multimedia, display devices are becoming more important. In response to the development, various types (e.g., suitable kinds) of displays such as liquid crystal display (LCD) devices, organic light-emitting diode (OLED) display devices, and the like are being used.

Recently, foldable display devices to which flexible display panels are applied have been developed to provide large screens and improve portability when used. Each component of the flexible display panel is made of a material having flexibility to be bendable.

Window members applied to the flexible display panels may also have flexibility, allowing such window members to be folded or unfolded along with the flexible display panels to which they are applied. To this end, a pattern for enhancing the flexibility of a window member may be formed in at least a portion of the window member.

SUMMARY

Aspects of embodiments of the present disclosure are directed toward a window member allowing visibility of a pattern formed in the window member to be reduced, a display device including the window member, and a method of manufacturing the display device.

However, it should be noted that aspects of embodiments of the present disclosure are not limited to the above-described aspects of embodiments, and other aspects of embodiments of the present disclosure will be apparent to those of ordinary skill in the art from the following descriptions.

According to some embodiments of the present disclosure, there is provided a display device including a display panel, and a window member on the display panel, wherein the window member includes a window base material including a flexible portion in which a first area having a first rigidity and a second area having a second rigidity that is less than the first rigidity are alternately located (e.g., the first area being less in rigidity than the second area), a buffer layer on the window base material and having a refractive index that is smaller than a refractive index of the window base material, and a filler layer on the buffer layer and having a refractive index that is smaller than the refractive index of the buffer layer.

According to other embodiments of the present disclosure, there is provided a window member including a window base material including a flexible portion in which a first area having a first rigidity and a second area having a second rigidity that is less than the first rigidity are alternately located, a buffer layer on the window base material and having a refractive index that is smaller than a refractive index of the window base material, and a filler layer on the buffer layer and having a refractive index that is smaller than the refractive index of the buffer layer.

According to other embodiments of the present disclosure, there is provided a method of manufacturing a display device including forming a pattern including a first area having a first rigidity and a second area having a second rigidity that is less than the first rigidity in a window base material, forming a buffer layer having a refractive index that is smaller than a refractive index of the window base material on the pattern, and forming a filler layer on the buffer layer, the filler layer having a refractive index that is smaller than the refractive index of the buffer layer.

BRIEF DESCRIPTION OF THE DRAWINGS

The above and other aspects and features of the present disclosure will become more apparent by describing example embodiments thereof in detail with reference to the attached drawings, in which.

DETAILED DESCRIPTION

The present disclosure will now be described more fully hereinafter with reference to the accompanying drawings, in which some embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those of ordinary skill in the art. The same reference numbers indicate the same components throughout the specification. In the attached drawings, the thickness of layers and regions may be exaggerated for clarity.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

Hereinafter, example embodiments of the present disclosure will be described in more detail with reference to the accompanying drawings.

Figure 1:
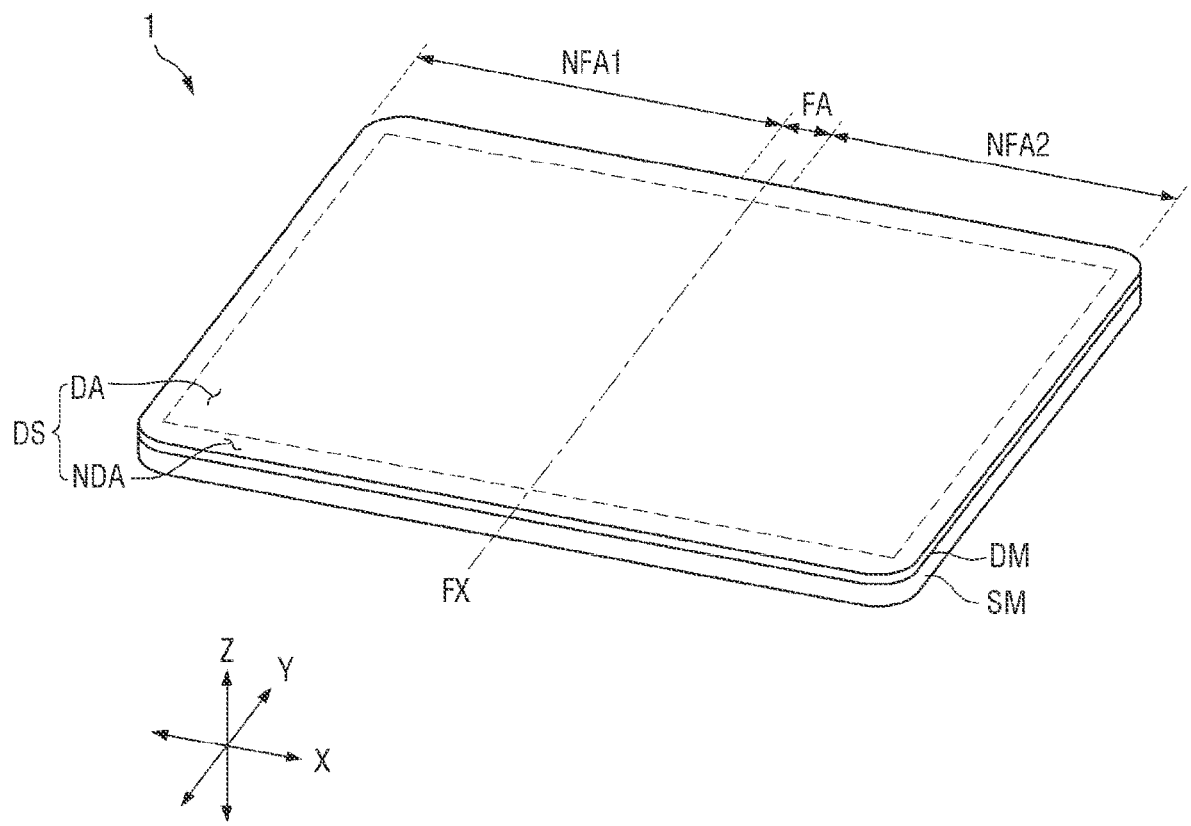
FIG. 1 is a perspective view illustrating a display device, according to some embodiments of the present disclosure.
Figure 2:
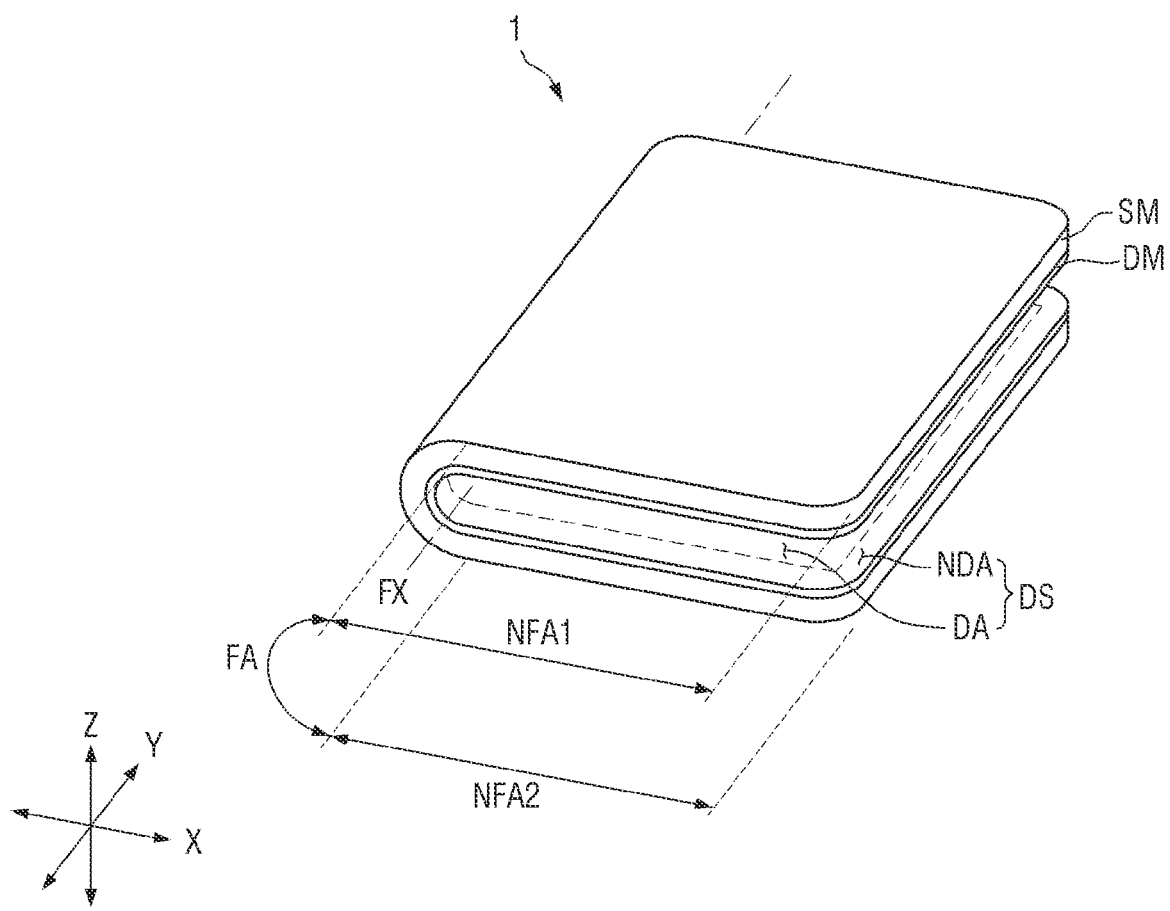
FIG. 2 is a perspective view illustrating an in-folding state of the display device, according to some embodiments of the present disclosure.
Figure 3:
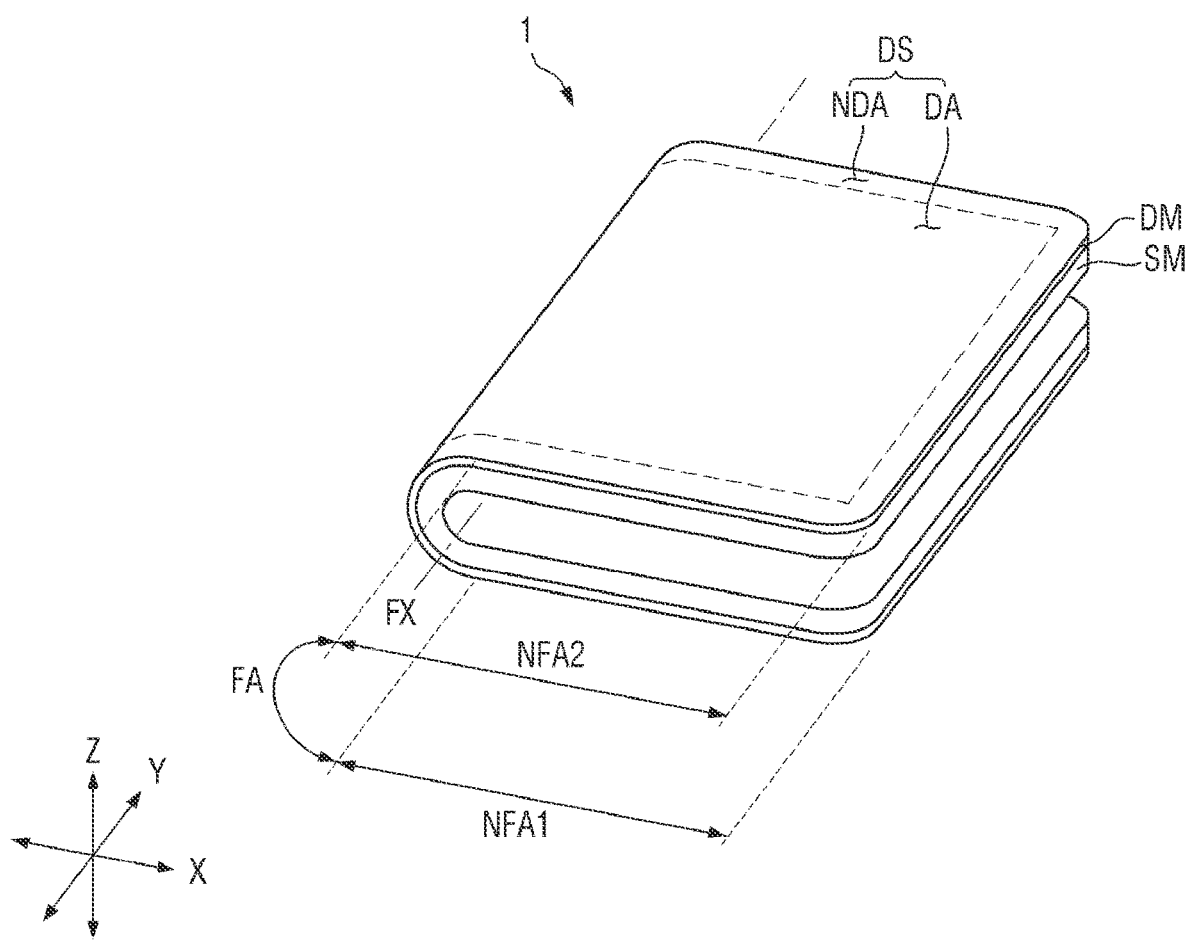
FIG. 3 is a perspective view illustrating an out-folding state of the display device, according to some embodiments of the present disclosure.
Figure 4:
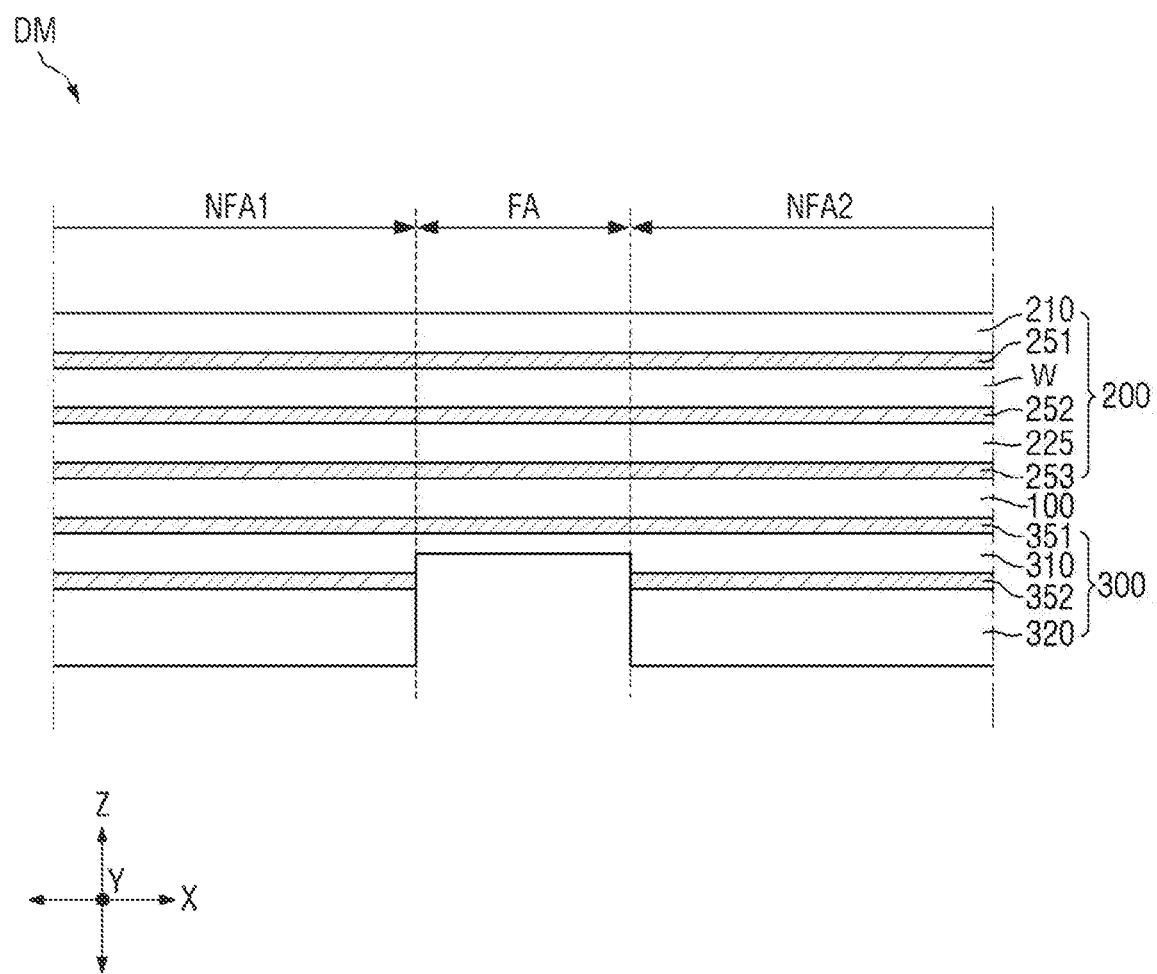
FIG. 4 is a cross-sectional view illustrating a display module of the display device, according to some embodiments of the present disclosure.
Figure 5:
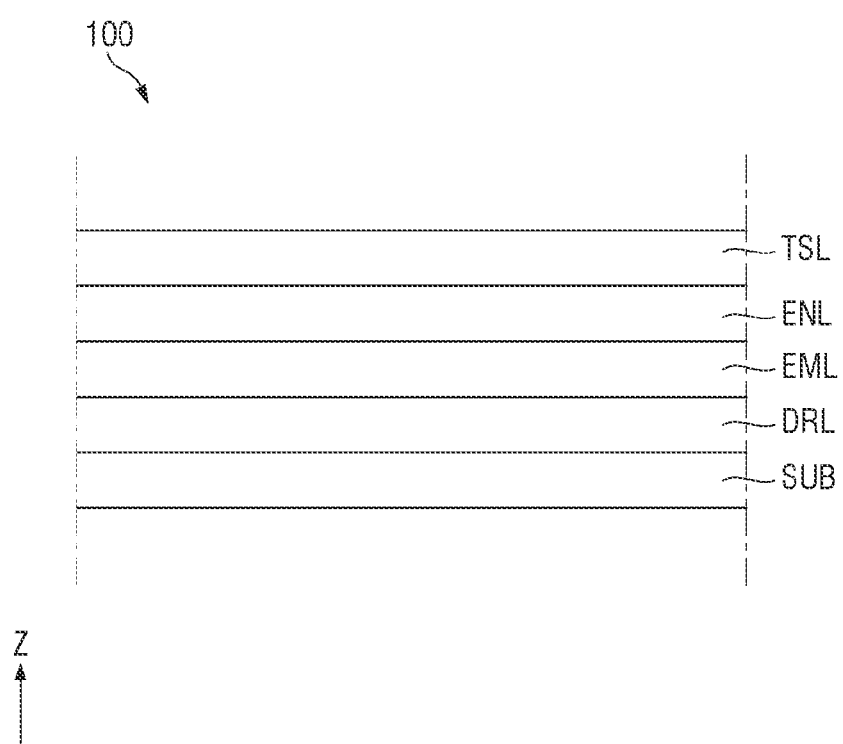
FIG. 5 is a cross-sectional view illustrating a display panel of the display device, according to some embodiments of the present disclosure.

FIG. 1 is a perspective view illustrating a display device, according to some embodiments of the present disclosure. FIG. 2 is a perspective view illustrating an in-folding state of the display device, according to some embodiments of the present disclosure. FIG. 3 is a perspective view illustrating an out-folding state of the display device, according to some embodiments of the present disclosure. FIG. 4 is a cross-sectional view illustrating a display module of the display device, according to some embodiments of the present disclosure. FIG. 5 is a cross-sectional view illustrating a display panel of the display device, according to some embodiments of the present disclosure.

Hereinafter, a first direction X (e.g., an X-axis direction), a second direction Y (e.g., a Y-axis direction), and a third direction Z (e.g., a Z-axis direction) cross each other in different directions. For example, the first direction X may be a length direction, the second direction Y may be a width direction, and the third direction Z may be a thickness direction. The first direction X, the second direction Y, and the third direction Z may each include two or more directions. For example, the third direction Z may include an upward direction toward an upper side of the drawing and a downward direction toward a lower side of the drawing. In this case, one surface of a member located in the upward direction may be referred to as an upper surface, and another surface of the member located in the downward direction may be referred to as a lower surface. However, the above directions should be understood as referring to relative directions, and the present disclosure is not limited thereto.

A display device 1 according to some embodiments of the present disclosure may include various suitable devices which display screens or images. Non-limiting examples of the display device 1 may include smart phones, mobile phones, tablet personal computers (PCs), personal digital assistants (PDAs), portable multimedia players (PMPs), televisions, game machines, wrist watch type electronic devices, head mounted displays, PC monitor, laptop computers, vehicle navigation device, vehicle instrument panels, digital cameras, camcorders, outdoor advertising boards, electronic notice boards, various medical devices, various inspection devices, various home appliances such as refrigerators and washing machines, each including a display area (DPA), Internet of Things (IoT) devices, and/or the like, but the present disclosure is not limited thereto.

Referring to FIGS. 1 and 2, the display device 1 may have a rectangular shape when viewed in a plan view. In some embodiments, when viewed in the plan view, the display device 1 may have two long sides (e.g., relatively long sides) in the first direction X and two short sides (e.g., relatively short) in the second direction Y intersecting the first direction X. However, the present disclosure is not limited thereto, and the display device 1 may have various shapes.

The display device 1 may include an upper surface and a lower surface. The display device 1 may further include at least one side surface between the upper surface and the lower surface.

The display device 1 includes at least one display surface DS. In some embodiments, the display surface DS may be the upper surface of the display device 1. The display surface DS may be located at (e.g., extending across or overlapping with) a folding area FA and non-folding areas NFA1 and NFA2 which will be described below. In some embodiments, both of the upper surface and the lower surface of the display device 1 may be the display surface DS. In some embodiments, the display device 1 may include a plurality of display surfaces DS. For example, the plurality of display surfaces DS may include two or more surfaces among the upper surface, the lower surface, and the side surface of the display device 1.

The display surface DS may include a display area DA and a non-display area NDA.

The display area DA may display a video or an image. A plurality of pixels may be in the display area DA.

The non-display area NDA may not display a video or an image. The non-display area NDA may be at a periphery of the display area DA. The non-display area NDA may surround the display area DA. In some embodiments, the display area DA may have a rectangular shape, and the non-display area NDA may be at the periphery of four sides of the display area DA, but the present disclosure is not limited thereto. A black matrix may be in the non-display area NDA to prevent or reduce leakage of light which is emitted from an adjacent pixel.

The display device 1 may be a foldable device. At least a part of the display device 1 may be bent (e.g., adjusted) or configured to be bent to be folded or unfolded. For example, a portion of the display device 1 may overlap another portion thereof or may be bent to be inclined with respect to another portion thereof, or the entirety of the display device 1 may be unfolded to be substantially flat. In some embodiments, the portion of the display device 1 may be folded (e.g., adjusted) with respect to another portion thereof at an angle greater than about 0° to less than about 180° or unfolded to form an inclination of about 180°.

The display device 1 may be in-folded and/or out-folded. As shown in FIG. 2, the in-folding may be such that a portion of the display surface DS of the display device 1 is folded to face another portion of the display surface DS (e.g., to face inward). In some embodiments, for example, as shown in FIG. 3, the out-folding may be such that a portion of the display surface DS of the display device 1 is folded not to face another portion of the display surface DS (e.g., to face outward). The out-folding may be such that a portion of a surface opposite to the display surface DS of the display device 1 is folded to face another portion of the surface opposite to the display surface DS. In some embodiments, the display device 1 may be a bidirectional (e.g., bidirectionally) foldable device which is in-foldable and out-foldable.

The display device 1 may have a folded state or an unfolded state. The folded state may include a state in which the display device 1 is bent. For example, the folded state may be a state in which a portion of the display device 1 is bent to form an inclination with respect to another portion thereof, and the unfolded state may be a state in which a portion of the display device 1 is coplanar with another portion thereof. In some embodiments, the folded state may be a state in which an angle between a portion of the display device 1 and another portion is about 0° or more to less than about 180° and/or greater than about 180° to less than about 360°, and the unfolded state may be a state in which an angle between a portion of the display device 1 and another portion is an angle of about 180°. Here, the portion and another portion may each be non-folding areas NFA1 and NFA2 which will be described below.

The folded state may include at least one state of an in-folding state, as shown in FIG. 2, in which a portion of the display surface DS of the display device 1 faces another portion of the display surface DS, and an out-folding state, as shown in FIG. 3, in which a portion of a surface opposite to the display surface DS of the display device 1 faces another portion of the surface opposite to the display surface DS.

The display device 1 may be divided into the folding area FA and the non-folding areas NFA1 and NFA2. The folding area FA may be an area which is folded or bent as the display device 1 is folded. The non-folding areas NFA1 and NFA2 may be areas which are not folded or bent. The non-folding areas NFA1 and NFA2 may include a first non-folding area NFA1 and a second non-folding area NFA2. In some embodiments, the first non-folding area NFA1 and the second non-folding area NFA2 may be arranged in the first direction X, and the folding area FA may be between the first non-folding area NFA1 and the second non-folding area NFA2. In some embodiments, one folding area FA and two non-folding areas NFA1 and NFA2 may be defined in the display device 1, but the present disclosure is not limited thereto.

In some embodiments, a plurality of folding areas FA and a plurality of non-folding areas NFA1 and NFA2 may be defined in the display device 1. Although the first non-folding area NFA1, the second non-folding area NFA2, and the folding area FA have been described based on the entirety of the display device 1, members constituting the display device 1 may also be divided into the first non-folding area NFA1, the second non-folding area NFA2 and/or the folding area FA.

The display device 1 may be folded or unfolded based on (e.g., with respect to or around) a folding axis FX. The folding axis FX may overlap with the folding area FA in the thickness direction (e.g., the third direction Z in FIG. 1). In some embodiments, the display device 1 may be folded or unfolded based on (e.g., with respect to or around) the folding axis FX in the second direction Y (e.g., the folding axis FX may extend along the Y-axis direction and the device 1 may be folded about the Y-axis as in FIG. 2 and FIG. 3), but the present disclosure is not limited thereto. For example, the folding axis FX may include at least one rotational axis.

The display device 1 may include a display module DM and a support member SM supporting the display module DM. In some embodiments, the display module DM may form the upper surface of the display device 1, and the support member SM may be located on a lower surface of the display module DM to support the display module DM.

At least some of (e.g., a portion of) the display module DM and the support member SM may have suitable flexibility. The display module DM and the support member SM may be located at (e.g., extending across or overlapping with) the first non-folding area NFA1, the folding area FA, and the second non-folding area NFA2 and folded based on the folding axis FX.

Referring to FIGS. 4 and 5, the display module DM may include a display panel 100, an upper stacked structure 200 on an upper surface of the display panel 100, and a lower stacked structure 300 on a lower surface of the display panel 100. The upper surface of the display panel 100 may be a surface on which an image is displayed. In some embodiments, the display panel 100, the upper stacked structure 200, and the lower stacked structure 300 may be located at (e.g., extending across or overlapping with) the first non-folding area NFA1, the folding area FA, and the second non-folding area NFA2. In some embodiments, at least one selected from among members constituting the upper stacked structure 200 and the lower stacked structure 300 may be separated based on the folding area FA (e.g., as discussed below to facilitate folding).

The display panel 100 may be a panel which displays an image. Non-limiting examples of the display panel 100 may include not only self-luminous display panels such as organic light-emitting diode (OLED) display panels, inorganic light-emitting (EL) display panels, quantum dot light-emitting (QLED) display panels, micro LED display panels, nano LED display panels, plasma display panels (PDPs), field emission display (FED) panels, and/or cathode ray tubes (CRTs), but also light-receiving display panels such as liquid crystal display (LCD) panels, and/or electrophoretic display (EPD) panels. Hereinafter, the OLED display panel will be described as an example of a display panel, and the OLED display panel applied to embodiments will be simply referred to as the display panel 100 unless special classification is suitable. However, the embodiments are not limited to the OLED display panel, and other suitable display panels listed above or in the related art may be applied.

The display panel 100 may further include a touch member. The touch member may be provided as a panel or film separate from the display panel 100 and bonded on the display panel 100 and, in some embodiments, may be provided in the form of a touch layer in the display panel 100. In the following embodiments, a case in which the touch member is provided in the display panel 100 and included in the display panel 100 will be described, but the present disclosure is not limited thereto.

Referring to FIG. 5, the display panel 100 may include a substrate SUB, a circuit driving layer DRL on the substrate SUB, a light-emitting layer EML on the circuit driving layer DRL, an encapsulation layer ENL on the light-emitting layer EML, and a touch layer TSL on the encapsulation layer ENL.

The substrate SUB may be a flexible substrate including a flexible polymer material such as polyimide. Thus, the display panel 100 can be (e.g., may be capable of being) curved, bent, folded, or rolled. In some embodiments, the substrate SUB may include a plurality of sub-substrates overlapping in the thickness direction with barrier layers interposed therebetween. In this case, each sub-substrate of the plurality of sub-substrates may be a flexible substrate.

The circuit driving layer DRL may be on the substrate SUB. The circuit driving layer DRL may include a circuit which drives the light-emitting layer EML of a pixel. The circuit driving layer DRL may include a plurality of thin film transistors.

The light-emitting layer EML may be on the circuit driving layer DRL. The light-emitting layer EML may include an organic light-emitting layer. The light-emitting layer EML may emit light with variable brightness according a drive signal transmitted from the circuit driving layer DRL.

The encapsulation layer ENL may be on the light-emitting layer EML. The encapsulation layer ENL may include an inorganic film or a stacked film of an inorganic film and an organic film.

The touch layer TSL may be on the encapsulation layer ENL. The touch layer TSL may be a layer which detects a touch input and may perform a function of a touch member. The touch layer TSL may include a plurality of sensing areas and a plurality of sensing electrodes.

Referring to FIG. 4 again, the upper stacked structure 200 may be on the display panel 100. The upper stacked structure 200 may include a polarizing member 225, a window member W, and a window member protective layer 210 which are stacked (e.g., sequentially stacked) upward from the display panel 100.

The polarizing member 225 may polarize light which passes through the polarizing member 225. The polarizing member 225 may serve to reduce the reflection of external light. In some embodiments, the polarizing member 225 may be a polarizing film. The polarizing film may include a polarizing layer and protective base materials, which may sandwich the polarizing layer at the top and bottom thereof. The polarizing layer may include a polyvinyl alcohol film. The polarizing layer may be stretched in one direction. A stretching direction of the polarizing layer may be an absorption axis, and a direction perpendicular to the stretching direction thereof may be a transmission axis. The protective base materials may be on one side and another side (e.g., a side facing oppositely away from the one side) of the polarizing layer. The protective base material may be made of a cellulose resin such as triacetyl cellulose, a polyester resin, or the like, but the present disclosure is not limited thereto.

The window member W may be on the polarizing member 225. The window member W serves to protect the display panel 100. The window member W may be made of a transparent material. For example, the window member W may be made of glass or plastic. A detailed configuration of the window member W will be described below with reference to FIGS. 6 to 8.

The window member protective layer 210 may be on the window member W. The window member protective layer 210 may perform at least one selected from among a function of preventing the window member W from shattering (e.g., reducing a risk that the window member W may shatter or break), a function of absorbing impacts, a function of preventing or reducing dents, a function of preventing or reducing fingerprints, and a function of preventing or reducing glare. The window member protective layer 210 may be made of a transparent polymer film. The transparent polymer film may include at least one selected from among polyethylene terephthalate (PET), polyethylene naphthalate (PEN), polyether sulfone (PES), polyimide (PI), polyarylate (PAR), polycarbonate (PC), polymethyl methacrylate (PMMA), and a cycloolefin copolymer (COC).

The upper stacked structure 200 may include upper coupling members 251, 252, and 253 which couple adjacent stacked members. For example, a first coupling member 251 may be between the window member W and the window member protective layer 210 for coupling thereof, a second coupling member 252 may be between the window member W and the polarizing member 225 for coupling thereof, and a third coupling member 253 may be between the polarizing member 225 and the display panel 100 for coupling thereof.

For example, the upper coupling members 251, 252, and 253 may be members that bond layers on one surface (e.g., an upper surface) of the display panel 100. The first coupling member 251 may be a protective layer coupling member for bonding the window member protective layer 210, the second coupling member 252 may be a window coupling member for bonding the window member W, and the third coupling member 253 may be a polarizing member coupling member for bonding the polarizing member 225. All the upper coupling members 251, 252, and 253 may be optically transparent.

The lower stacked structure 300 may be below the display panel 100. The lower stacked structure 300 may include a polymer film layer 310 and a heat dissipation member 320 which are stacked (e.g., sequentially stacked) downward from the display panel 100.

The polymer film layer 310 may include a polymer film. For example, the polymer film layer 310 may include PI, PET, PC, PE, PP, PSF, PMMA, TAC, COP, and/or the like. The polymer film layer 310 may include a functional layer on at least one surface thereof. For example, the functional layer may include a light absorbing layer. The light absorbing layer may include a light absorbing material such as a black pigment or a dye. The light absorbing layer may be formed on a polymer film using black ink through a coating or printing method.

The heat dissipation member 320 may be below the polymer film layer 310. The heat dissipation member 320 may serve to diffuse heat generated from the display panel 100 or other components of the display device 1. The heat dissipation member 320 may be a heat dissipation sheet including graphite or carbon nanotubes. In some embodiments, as shown in FIGS. 3 and 4, heat dissipation members 320 may be separated based on the folding area FA so as to facilitate folding of the display device 1. In some embodiments, the heat dissipation members 320 may be connected as one member.

The lower stacked structure 300 may include lower coupling members 351 and 352, which couple adjacent stacked members. For example, a fourth coupling member 351 may be between the display panel 100 and the polymer film layer 310 for coupling thereof, and a fifth coupling member 352 may be between the polymer film layer 310 and the heat dissipation member 320 for coupling thereof.

In some embodiments, the lower stacked structure 300 may further include a buffer member. For example, the buffer member may be between the polymer film layer 310 and the heat dissipation member 320.

Figure 6:
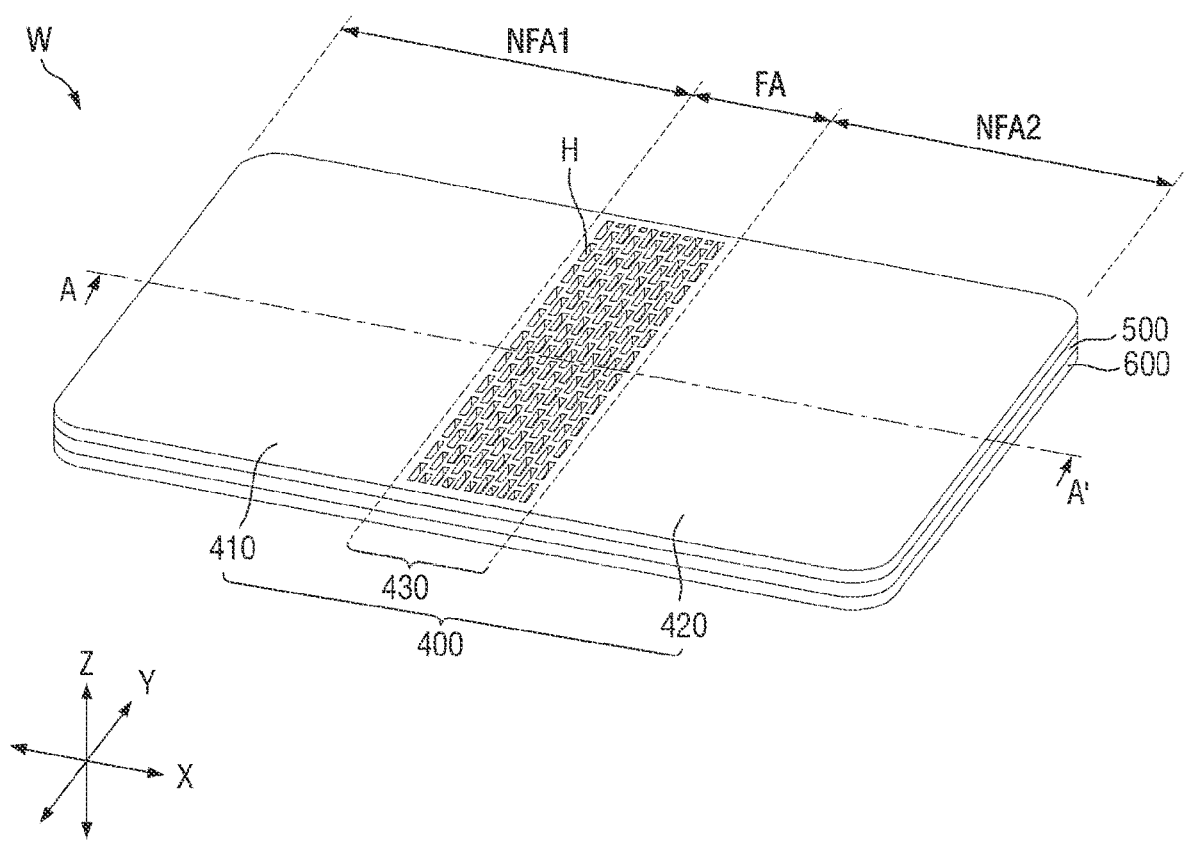
FIG. 6 is a perspective view illustrating a window member of the display device, according to some embodiments of the present disclosure.
Figure 7:
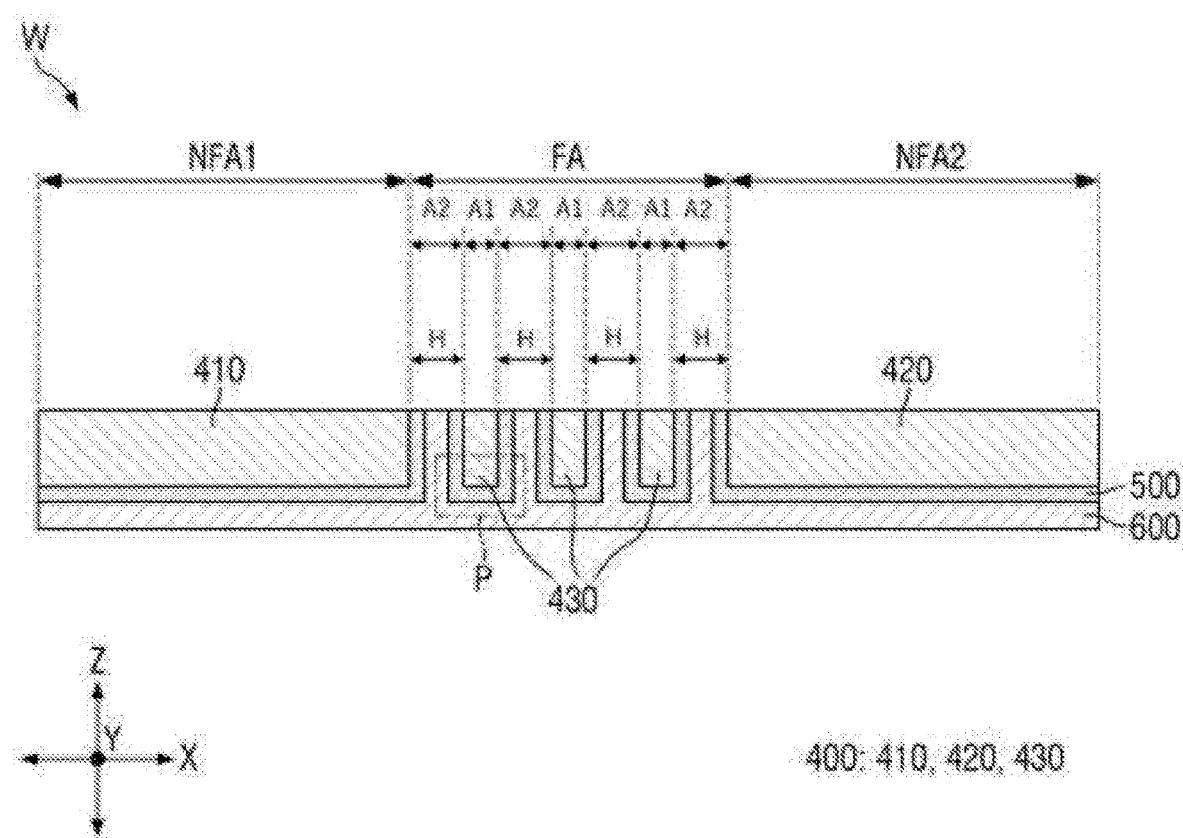
FIG. 7 is a cross-sectional view taken along line A-A' of FIG. 6, according to some embodiments of the present disclosure.
Figure 8:
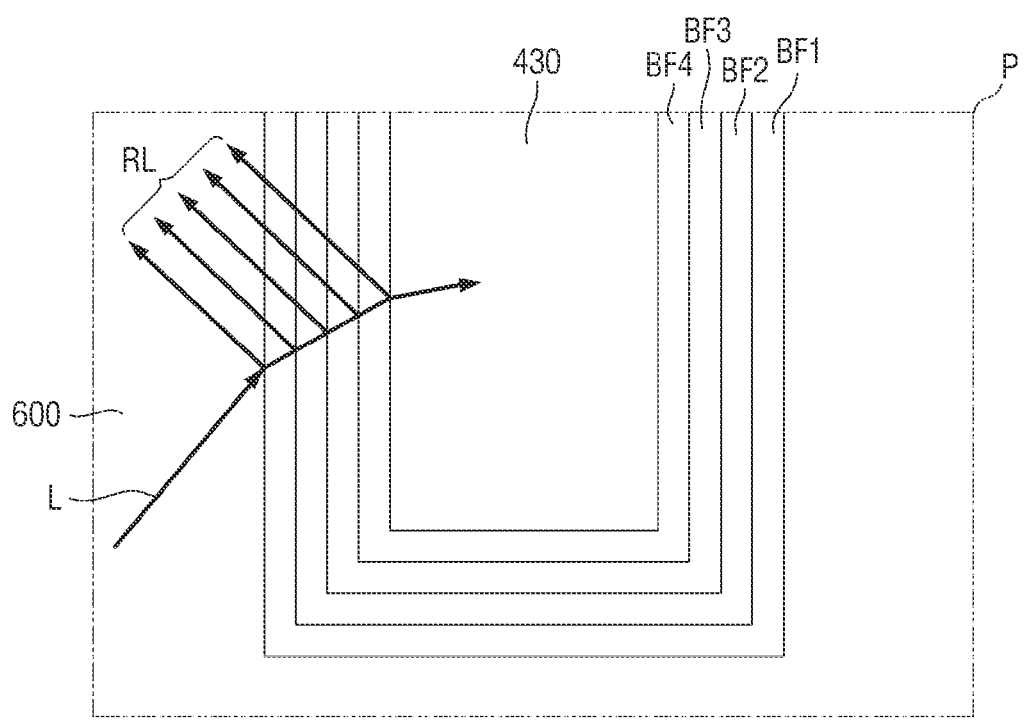
FIG. 8 is an enlarged cross-sectional view illustrating portion P of FIG. 7, according to some embodiments of the present disclosure.

FIG. 6 is a perspective view illustrating a window member of the display device, according to some embodiments of the present disclosure. FIG. 7 is a cross-sectional view taken along line A-A' of FIG. 6, according to some embodiments of the present disclosure. FIG. 8 is an enlarged cross-sectional view illustrating portion P of FIG. 7, according to some embodiments of the present disclosure.

As described above, referring to FIGS. 4 to 6, the window member W may be on the display panel 100 to protect the display panel 100. In some embodiments, the window member W may be located between the window member protective layer 210 and the polarizing member 225. The window member W may be coupled to the window member protective layer 210 by the first coupling member 251, and may be coupled to the polarizing member 225 by the second coupling member 252, but the present disclosure is not limited thereto.

Referring to FIGS. 6 and 7, the window member W may include a window base material 400, a buffer layer 500, and a filler layer 600.

The window base material 400 may be located at (e.g., extending across or overlapping with) the first non-folding area NFA1, the folding area FA, and the second non-folding area NFA2. The window base material 400 may have a substantially rectangular shape when viewed in a plan view. In some embodiments, the window base material 400 may include two long (e.g., relatively long) sides in the first direction X and two short sides (e.g., relatively short) in the second direction Y, but the present disclosure is not limited thereto.

The window base material 400 may be made of a transparent material. The window base material 400 may be formed of a rigid material such as glass, PC, PMMA, a silicone resin, a transparent metal material, or the like.

For example, the glass may include soda lime glass, alkali aluminosilicate glass, borosilicate glass, or lithium aluminosilicate glass.

The glass may be ultra thin glass (UTG) or thin film glass. When the glass is made of UTG or thin film glass, the glass may have a flexible characteristic such as a curveable characteristic, a bendable characteristic, a foldable characteristic, a rollable characteristic. For example, a thickness of the glass may be about 10 μm to about 500 μm, or glass having a thickness of about 200 μm to about 300 μm may be applied.

In some embodiments, the window base material 400 may include glass which is chemically or thermally strengthened. Chemical strengthening may be achieved through an ion exchange process with an alkali salt. The ion exchange process may be performed two or more times.

In some embodiments, the window base material 400 may be made of a transparent plastic material. For example, the window base material 400 may be made of at least one selected from among PI, polyacrylate, PMMA, PC, PEN, polyvinylidene chloride, polyvinylidene difluoride (PVDF), polystyrene, an ethylene vinyl alcohol copolymer, PES, polyetherimide (PEI), polyphenylene sulfide (PPS), polyarylate, TAC, and cellulose acetate propionate (CAP).

The window base material 400 may include a first rigid portion 410, a second rigid portion 420, and a flexible portion 430.

The first rigid portion 410 and the second rigid portion 420 may be flat in the first non-folding area NFA1 and the second non-folding area NFA2, respectively. Each of the first rigid portion 410 and the second rigid portion 420 may have a rigidity that is greater than a rigidity of other portions, for example, the flexible portion 430. For example, the first rigid portion 410 and the second rigid portion 420 may be more rigid (e.g., stiff or less easily bent) than the flexible portion 430. When the display device 1 is folded or unfolded, the first rigid portion 410 and the second rigid portion 420 may be portions in which deformation hardly occurs. When the display device 1 is folded or unfolded, the first rigid portion 410 and the second rigid portion 420 may be portions which are not folded or not bent. For example, even when the display device 1 is folded, the first rigid portion 410 and the second rigid portion 420 may be portions which maintain flatness (e.g., remain substantially flat). In some embodiments, the first rigid portion 410 and the second rigid portion 420 may each be formed in a flat plate shape and may be symmetrically located based on (e.g., with respect to) the flexible portion 430, but the present disclosure is not limited thereto.

The flexible portion 430 may be in the folding area FA. The flexible portion 430 may be located between the first rigid portion 410 and the second rigid portion 420. One side of the flexible portion 430 may be coupled (e.g., connected) to the first rigid portion 410, and another side thereof may be coupled (e.g., connected) to the second rigid portion 420. The flexible portion 430 may have a rigidity that is smaller than (e.g., less than) a rigidity of each of the first rigid portion 410 and the second rigid portion 420 (e.g., the flexible portion 430 may be less rigid than the first rigid portion 410 and the second rigid portion 420). For example, the flexible portion 430 may have flexibility that is greater than (e.g., more flexible than) a flexibility of each of the first rigid portion 410 and the second rigid portion 420. When the display device 1 is folded or unfolded, the flexible portion 430 may be a portion in which greater deformation occurs than in other portions. When the display device 1 is folded or unfolded, the flexible portion 430 may be a portion which is bent or folded. In some embodiments, the flexible portion 430 may have an area that is smaller than (e.g., less than) an area of each of the first rigid portion 410 and the second rigid portion 420, and the first rigid portion 410, the flexible portion 430, and the second rigid portion 420 may be arranged (e.g., sequentially arranged) in the first direction X, but the present disclosure is not limited thereto.

Referring to FIG. 7, the flexible portion 430 may be divided into a first area A1 having a first rigidity and a second area A2 having a second rigidity that is smaller than (e.g., less than) the first rigidity of the first area A1. For example, the first area A1 may be more rigid than the second area A2.

The first area A1 may have a rigidity that is substantially the same as or similar to a rigidity of each of the first rigid portion 410 and the second rigid portion 420. The first area A1 of the flexible portion 430 may be made of the same material, e.g., glass, as the first rigid portion 410 and the second rigid portion 420. The first area A1 may be integrally coupled (e.g., connected) to the first rigid portion 410 and the second rigid portion 420 (e.g., the first area A1 may be integrally formed with the first rigid portion 410 and the second rigid portion 420). The first area A1 may refer to one area surrounding a plurality of second areas A2 or may refer to a plurality of areas, each having a rigidity that is greater than a rigidity of the second area A2. For example, each respective first area A1 may be more rigid than each respective second area A2.

The second area A2 may be a plurality of second areas in the flexible portion 430. The plurality of second areas may be areas in which all or part of the window base material 400 in the flexible portion 430 is removed. Because the window base material 400 is removed, the second area A2 may have a rigidity that is smaller than (e.g., less than) the rigidity of the first rigid portion 410, the second rigid portion 420, and/or the first area A1, and the flexible portion 430 may be allowed (e.g., configured or enabled) to be folded by an external force. As described below, the window base material 400 in the plurality of second areas A2 may be removed so that a plurality of holes H may be formed. For example, in some embodiments, the second area A2 may be a partial area (e.g., a portion) of the flexible portion 430 in which a plurality of holes H are formed, and the first area A1 may be the remaining area of the flexible portion 430 in which the plurality of holes H are not formed. The second area A2 may provide an empty space which may be filled with other materials. The second area A2 may be filled with the buffer layer 500 and/or the filler layer 600 which will be described below. In some embodiments, the first area A1 and the second area A2 may be located in only the flexible portion 430, but the present disclosure is not limited thereto. In some embodiments, the first area A1 and the second area A2 may be located even in the first rigid portion 410 and/or the second rigid portion 420.

Each of the plurality of second areas A2 may include a plurality of holes H.

The plurality of holes H may pass through the flexible portion 430 in the thickness direction (e.g., the Z-axis direction in FIG. 6 and FIG. 7). The plurality of holes H may be formed to form a pattern in the flexible portion 430. In some embodiments, when viewed in a plan view, the plurality of holes H may each have a long slit shape in the second direction Y, but the shape of the hole H is not limited thereto and may have various suitable shapes such as a rectangular shape, an oval shape, a circular shape, and/or the like. In some embodiments, for example, an inner surface of the hole H may extend vertically and may be flat, but the present disclosure is not limited thereto. In some embodiments, the inner surface of hole H may include at least one inclined or curved surface. In some embodiments, the hole H may be tapered such that a width of the hole H may vary in the thickness direction. In some embodiments, the plurality of holes H may be located at regular intervals, but the present disclosure is not limited thereto. In some embodiments, the plurality of holes H may be located at variable intervals to have a set or predetermined tendency (e.g., a pattern) or may be located at irregular intervals (e.g., random or without a pattern). In some embodiments, the plurality of holes H are formed in only the flexible portion 430, but the present disclosure is not limited thereto. In some embodiments, the plurality of holes H may be formed even in the first rigid portion 410 and/or the second rigid portion 420.

The buffer layer 500 may be on the window base material 400. The buffer layer 500 may be in direct contact with the window base material 400. The buffer layer 500 may be located at (e.g., extending across or overlapping with) the first non-folding area NFA1, the folding area FA, and the second non-folding area NFA2. The buffer layer 500 may be located at (e.g., extending across or overlapping with) the first rigid portion 410, the flexible portion 430, and the second rigid portion 420. In some embodiments, the buffer layer 500 may be located only in the flexible portion 430 and/or the folding area FA.

The buffer layer 500 may be on a pattern formed by the plurality of holes H of the flexible portion 430. As shown in FIG. 7, the buffer layer 500 may be on a lower surface of the window base material 400 and may further be on the inner surface of each of the plurality of holes H. In this case, the inner surface of each of the plurality of holes H may be in direct contact with the buffer layer 500. A portion of the buffer layer 500 on the lower surface of the window base material 400 and other portions of the buffer layer 500 in the plurality of holes H may be integrally coupled (e.g., connected) (e.g., integrally formed). In some embodiments, the buffer layer 500 may have a thickness (e.g., a set or predetermined thickness) on a lower surface of the first rigid portion 410 of the window base material 400, a lower surface of the second rigid portion 420, and a lower surface of the flexible portion 430, and the buffer layer 500 in the flexible portion 430 may have a shape (e.g., an irregular shape) corresponding to a shape (e.g., an irregular shape) formed by the plurality of holes H of the flexible portion 430. In this case, when viewed in a cross section, the buffer layer 500 may extend flatly on the lower surface of the first rigid portion 410, the second rigid portion 420, and/or a lower surface of the first area A1 of the flexible portion 430 in the horizontal direction. The buffer layer 500 may be bent in an "L" shape at a corner portion formed by a hole H formed in a second area A2 and by a lower surface of a first area A1 to extend upward to cover an inner surface of the hole H. Thus, when viewed in the cross section, the buffer layer 500 may have a "U"-shaped cross section on the lower surface of the first area A1 and may be located on inner surfaces of two holes H with the first area A1 located therebetween.

As shown in FIG. 7, in some embodiments, the buffer layer 500 may be located such that the plurality of holes H are not blocked (e.g., not completely filled by portions of the buffer layer 500). In some embodiments, in the buffer layer 500 in the hole H, when viewed in a cross section, a portion of the buffer layer 500 on or at an inner surface of one side may be coupled (e.g., connected) to another portion of the buffer layer 500 on or at an inner surface of another side, which is opposite to the inner surface of the one side, at an upper end portion in the horizontal direction so that the hole H may be blocked due to (e.g., by) the buffer layer 500. For example, portions of the buffer layer 500 on opposing inner surfaces (e.g., surfaces facing each other) of a hole H may be formed such that the buffer layer 500 blocks (e.g., partially blocks) the hole H.

The buffer layer 500 may be located between the window base material 400 and the filler layer 600 to reduce or prevent external visibility of the pattern formed on the flexible portion 430 of the window base material 400. The buffer layer 500 may be an anti-reflective layer which reduces the reflection of incident light incident on the pattern of the flexible portion 430. The incident light may be external light or light emitted from the display panel 100.

A refractive index of the buffer layer 500 may be smaller than (e.g., less than) a refractive index of the window base material 400 and may be greater than a refractive index of the filler layer 600. In this case, the refractive index of the window base material 400 may be greater than the refractive index of the filler layer 600, and a difference in refractive index between the window base material 400 and the filler layer 600 may be greater than or equal to about 0.003. For example, the refractive index of the window base material 400 may be about 1.4 to about 1.6, the refractive index of the filler layer 600 may be about 1.3 to about 1.6, and a deviation in refractive index therebetween may be greater than or equal to about 0.003. As another example, the difference in refractive index between the window base material 400 and the buffer layer 500 and the difference in refractive index between the filler layer 600 and the buffer layer 500 may be less than or equal to about 0.003. As still another example, the refractive index of the buffer layer 500 may be about 1.3 to about 1.6.

The buffer layer 500 may have a thickness corresponding to a wavelength of the incident light incident on the buffer layer 500. For example, the buffer layer 500 may have a thickness of ¼ or ½ of the wavelength of the incident light. The buffer layer 500 may be made of an inorganic material. The buffer layer 500 may be made of a material for preventing or reducing reflection. In some embodiments, the buffer layer 500 may include at least one selected from among $Na_3AlF_6$, $MgF_2$, $AlF_3$, $LiF_2$, $CaF_2$, $SiO_2$, $Al_2O_3$, $SnO_2$, $Y_2O_3$, MgO, and a combination thereof. The refractive index of the buffer layer 500 may be appropriately (or suitably) adjusted due to (e.g., based on) a combination of the above materials.

The filler layer 600 may be on the buffer layer 500. The filler layer 600 may be located at (e.g., extending across or overlapping with) the first non-folding area NFA1, the folding area FA, and the second non-folding area NFA2. The filler layer 600 may be located at (e.g., extending across or overlapping with) the first rigid portion 410, the flexible portion 430, and the second rigid portion 420. In some embodiments, the filler layer 600 may be located only in the folding area FA and/or the flexible portion 430.

The filler layer 600 may fill the empty space of the second area A2. In some embodiments, the filler layer 600 may fill the interiors of the plurality of holes H. For example, the buffer layer 500 and the filler layer 600 may be stacked (e.g., sequentially stacked) downward from the lower surfaces of the first rigid portion 410 and the second rigid portion 420, and the buffer layer 500 and the filler layer 600 may be stacked (e.g., sequentially stacked) on the inner surfaces of the plurality of holes H in the horizontal direction (e.g., the X-axis direction in FIG. 7) toward the centers of the plurality of holes H. The filler layer 600 may infiltrate into (e.g., be located within) the plurality of holes H such that a portion of an upper surface of the filler layer 600 in the flexible portion 430 may have a shape (e.g., an irregular shape) corresponding to the shape of the plurality of holes H. Thus, an average thickness of the filler layer 600 in (e.g., at) the first rigid portion 410 and the second rigid portion 420 may be smaller than (e.g., less than) an average thickness of the filler layer 600 in the flexible portion 430.

The filler layer 600 may be made of a material which is optically transparent and has a rigidity that is smaller than (e.g., less than) a rigidity of the window base material 400 and/or a rigidity of the buffer layer 500 (e.g., the filler layer 600 may be more flexible than each of the window base material 400 and/or the buffer layer 500). When the display device 1 is folded or unfolded, the filler layer 600 may be compressed or stretched. For example, the filler layer 600 may include an acrylic-based, silicone-based, epoxy-based, phenol-based, polyimide-based, or urethane-based resin. As another example, the filler layer 600 may include a thermosetting resin or an ultraviolet (UV) curable resin. As still another example, the filler layer 600 may include an optical adhesive resin or an optical adhesive material.

Referring to FIG. 8, the buffer layer 500 may include a plurality of layers BF1, BF2, BF3, and BF4 having different refractive indexes. In FIG. 8, four layers are illustrated as the plurality of layers BF1, BF2, BF3, and BF4, but a number of the plurality of layers BF1, BF2, BF3, and BF4 is not limited thereto. Hereinafter, for convenience of description, the four layers, which may be stacked (e.g., sequentially stacked) from the window base material 400 toward the filler layer 600, will be referred to as a first layer BF1, a second layer BF2, a third layer BF3, and a fourth layer BF4. In some embodiments, the buffer layer 500 may be implemented as a single layer, as two layers, as three layers, or as five or more layers.

A refractive index of each of the plurality of layers BF1, BF2, BF3, and BF4 may be smaller than (e.g., less than) the refractive index of the window base material 400 and greater than the refractive index of the filler layer 600. For example, each of the plurality of layers BF1, BF2, BF3, and BF4 may have a refractive index of about 1.3 to 1.6.

In some embodiments, the refractive indexes of the plurality of layers BF1, BF2, BF3, and BF4 may be configured to gradually increase (e.g., may increase) in a direction from the filler layer 600 toward the window base material 400 (e.g., 430). For example, the refractive indexes of the plurality of layers BF1, BF2, BF3, and BF4 may be configured to gradually decrease (may decrease) in a direction from the window base material 400 toward the filler layer 600. For example, the refractive index of the first layer BF1 may be greater than the refractive index of the filler layer 600 and smaller than (e.g., less than) the refractive index of the second layer BF2, the refractive index of the second layer BF2 may be greater than the refractive index of the first layer BF1 and smaller than (e.g., less than) the refractive index of the third layer BF3, the refractive index of the third layer BF3 may be greater than the refractive index of the second layer BF2 and smaller than (e.g., less than) the refractive index of the fourth layer BF4, and the refractive index of the fourth layer BF4 may be greater than the refractive index of the third layer BF3 and smaller than (e.g., less than) the refractive index of the window base material 400. In this case, a difference in refractive index between the window base material 400 and the filler layer 600 may be greater than or equal to about 0.003. In some embodiments, each of a difference in refractive index between the filler layer 600 and the first layer BF1, a difference in refractive index between the first layer BF1 and the second layer BF2, a difference in refractive index between the second layer BF2 and the third layer BF3, a difference in refractive index between the third layer BF3 and the fourth layer BF4, and a difference in refractive index between the fourth layer BF4 and the window base material 400 may be less than or equal to about 0.003. In some embodiments, the sum of a difference in refractive index between the filler layer 600 and the first layer BF1, a difference in refractive index between the first layer BF1 and the second layer BF2, a difference in refractive index between the second layer BF2 and the third layer BF3, a difference in refractive index between the third layer BF3 and the fourth layer BF4, and a difference in refractive index between the fourth layer BF4 and the window base material 400 may be less than or equal to about 0.003.

In some embodiments, the refractive indexes of the plurality of layers BF1, BF2, BF3, and BF4 may be configured to gradually increase and then decrease in the direction from the filler layer 600 toward the window base material 400. For example, the refractive index of the first layer BF1 may be greater than the refractive index of the filler layer 600, the refractive index of the fourth layer BF4 may be smaller than (e.g., less than) the refractive index of the window base material 400, and the refractive index of each of the second layer BF2 and the third layer BF3 may be greater than the refractive indexes of the first layer BF1 and the fourth layer BF4. In some embodiments, the refractive index of each of the second layer BF2 and the third layer BF3 may be greater than the refractive indexes of the window base material 400 and the filler layer 600. In some embodiments, the refractive index of the second layer BF2 may be greater or smaller than (e.g., less than) the refractive index of the third layer BF3. In some embodiments, the refractive index of the second layer BF2 may be substantially equal to the refractive index of the third layer BF3.

A thickness of each of the plurality of layers BF1, BF2, BF3, and BF4 may be determined by a wavelength of incident light L. The thickness may be an optical path length of the incident light L passing through each layer. Owing to (e.g., based on) the optical path length, a phase difference between pieces of reflected light RL reflected from an interface of each layer may occur, and destructive interference between the pieces of reflected light RL may be induced. For example, each of the first layer BF1, the second layer BF2, the third layer BF3, and the fourth layer BF4 may have a thickness of about ¼ or ½ of the wavelength of the incident light L (e.g., each layer may be between about ¼ and about ½ of the wavelength of incident light incident on the buffer layer). As another example, each of the first layer BF1, the second layer BF2, the third layer BF3, and the fourth layer BF4 may have a thickness of about ¼ of the wavelength of the incident light L. As still another example, each of the first layer BF1, the second layer BF2, the third layer BF3, and the fourth layer BF4 may have a thickness of about ½ of the wavelength of the incident light L. As yet another example, some of (e.g., less than all of) the first layer BF1, the second layer BF2, the third layer BF3, and the fourth layer BF4 may have a thickness of about ¼ of the wavelength of the incident light L, and the remaining layers thereof may have a thickness of about ½ of the wavelength of the incident light L. In some embodiments, the buffer layer 500 may be formed as a single layer or a double layer, and a thickness of the single layer or each thickness of the double layer may be about ¼ of the wavelength of the incident light L. In some embodiments, a thickness of a layer, e.g., the first layer BF1, in contact with the filler layer 600, and a thickness of a layer, e.g., the fourth layer BF4, in contact with the window base material 400 may each be about ¼ of the wavelength of the incident light L, and a thickness of the second layer BF2 and/or the third layer BF3 between the first layer BF1 and the fourth layer BF4 may be about ½ of the wavelength of the incident light L. In this case, any (e.g., either) one of the second layer BF2 and the third layer BF3 may be omitted.

For example, each of the plurality of layers BF1, BF2, BF3, and BF4 may include at least one selected from among $Na_3AlF_6$, $MgF_2$, $AlF_3$, $LiF_2$, $CaF_2$, $SiO_2$, $Al_2O_3$, $SnO_2$, $Y_2O_3$, MgO, and a combination thereof. The refractive index of each of the plurality of layers BF1, BF2, BF3, and BF4 may be adjusted (e.g., configured) according to a ratio at which the above materials are combined.

The plurality of layers BF1, BF2, BF3, and BF4 may be located between the window base material 400 and the filler layer 600 to reduce or prevent the pattern of the flexible portion 430 from being exposed to the outside (e.g., from being visible from the outside). For example, the window base material 400 and the filler layer 600 may have different refractive indexes. However, because accurate refractive index matching may not be made between the window base material 400 and the filler layer 600, a reflection of external light may occur at the interface between the window base material 400 and the filler layer 600. Consequently, the pattern of the flexible portion 430 of the window base material 400 may be exposed (e.g., may be visible from the outside). In order to reduce the visibility of the pattern, refractive index matching between the window base material 400 and the filler layer 600 may be considered. However, because there may be a conflicting relationship between an appropriate (or suitable) bending characteristic for folding or unfolding, for example, a stretch ratio, a recovery rate, or an adhesion rate, and a refractive index for reducing pattern visibility, it may be difficult to design the filler layer 600 to satisfy the appropriate (or suitable) bending characteristic and the refractive index concurrently (e.g., simultaneously). In the display device 1 according to one embodiment, the buffer layer 500 having the refractive index between the refractive indexes of the window base material 400 and the filler layer 600 is located between the window base material 400, for example, the pattern of the flexible portion 430, and the filler layer 600, and thus destructive interference between the pieces of reflected light RL, which are reflected at the interfaces between the window base material 400, the filler layer 600, and the plurality of layers BF1, BF2, BF3, and BF4 of the buffer layer 500, may be induced so that the pattern visibility of the flexible portion 430 may be reduced (e.g., more easily reduced).

Figure 9:
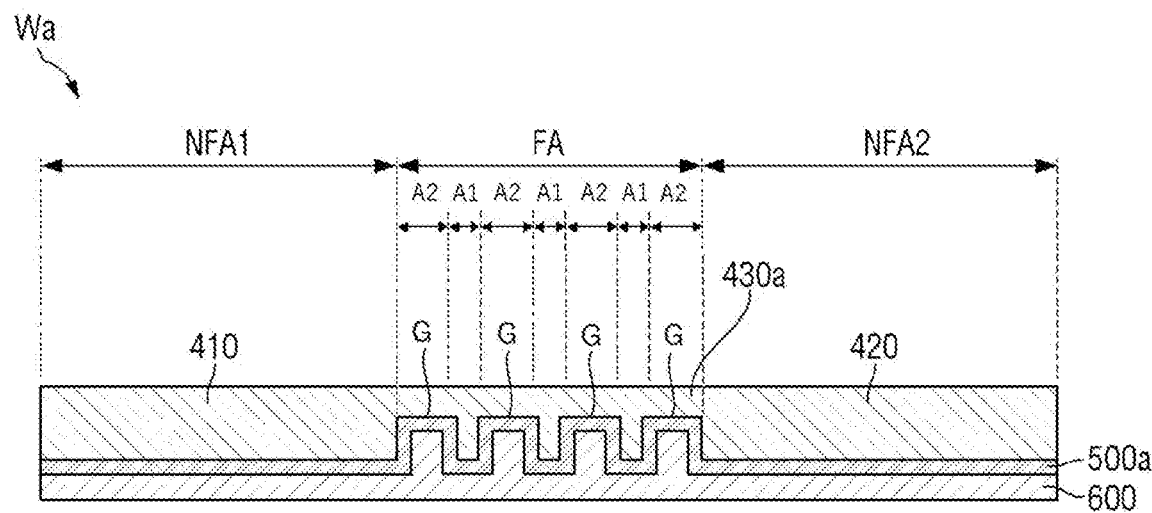
FIG. 9 is a cross-sectional view illustrating a window member, according to some embodiments of the present disclosure.

FIG. 9 is a cross-sectional view illustrating a window member, according to some embodiments of the present disclosure.

The non-limiting embodiment of FIG. 9 is different from the non-limiting embodiments of FIGS. 6 to 8 in that a window member Wa may include recessed portions G, instead of holes H, formed in a second area A2 of a flexible part 430a.

Referring to FIG. 9, as described above, the flexible part 430a may be divided into a first area A1 having a first rigidity and the second area A2 having a second rigidity that is smaller than (e.g., less than) the first rigidity of the first area A1. For example, the first area A1 may be more rigid than the second area A2. As shown in FIG. 9, when viewed in a cross section, a plurality of first areas A1 and a plurality of second areas A2 may be located in the flexible part 430a.

Unlike (e.g., in contrast to) the embodiment of FIGS. 6 to 8, the plurality of second areas A2 may include a plurality of recessed portions G, which are recessed upward from a lower surface of a window base material 400a. The recessed portions G may include a groove. Thus, irregularities (e.g., a shape) corresponding to a shape of the plurality of recessed portions G may be formed in a lower surface of the flexible part 430a of the window base material 400a. Each recessed portion G may be formed by removing a portion of the window base material 400a in the second area A2 of the flexible part 430a. In some embodiments, a cross-sectional shape of a recessed portion G may be a rectangular shape, but the present disclosure is not limited thereto. In some embodiments, the recessed portion G may have a cross section in a variety of suitable shapes such as a semi-elliptical shape, a semi-circular shape, a saw-toothed shape, a trapezoidal shape, and the like. In some embodiments, the plurality of recessed portions G are located at regular intervals, but the present disclosure is not limited thereto. In some embodiments, the plurality of recessed portions G may be located at variable intervals to have a pattern (e.g., a set or predetermined pattern or tendency) or may be located at irregular intervals (e.g., randomly or without a predetermined pattern). In some embodiments, the plurality of recessed portions G may be formed in only the flexible part 430a, but the present disclosure is not limited thereto. In some embodiments, the plurality of recessed portions G may be formed in a first rigid portion 410 and/or a second rigid portion 420 of the window base material 400a.

A buffer layer 500a may be on one surface of the window base material 400a. The buffer layer 500a may be directly on (e.g., contacting) one surface of the window base material 400a. The one surface of the window base material 400a may be a lower surface thereof. In some embodiments, the one surface of the window base material 400a may be an upper surface thereof. The buffer layer 500a may be located at (e.g., extending across or overlapping with) a first non-folding area NFA1, a folding area FA, and a second non-folding area NFA2 (e.g., the first rigid portion 410, the flexible part 430a, and the second rigid portion 420 of the window base material 400a). In some embodiments, the buffer layer 500a may be located only in the folding area FA (e.g., the flexible part 430a). The buffer layer 500a may be a single layer or may be formed as a plurality of layers BF1, BF2, BF3, and BF4 as shown in FIG. 8. The buffer layer 500a may cover (e.g., overlap with) a lower surface of the flexible part 430a. The buffer layer 500a may be located at a plurality of first areas A1 and at a plurality of second areas A2. A portion of the buffer layer 500a may be located at a lower surface of the flexible part 430a of a first area A1, and another portion of the buffer layer 500a may be located at the plurality of recessed portions G of a second area A2. The portion and the another portion of the buffer layer 500a may be integrally coupled (e.g., connected) (e.g., integrally formed). The buffer layer 500a may cover (e.g., overlap with) the lower surface of the flexible part 430a and the plurality of recessed portions G formed in the lower surface thereof. The buffer layer 500a may have a thickness (e.g., a set or predetermined thickness). In the folding area FA (e.g., the flexible part 430a), the buffer layer 500a may have a shape (e.g., an uneven shape) corresponding to the shape of the plurality of recessed portions G. In this case, a plurality of spaces or gaps recessed upward may be formed in a lower surface of the buffer layer 500a corresponding to the shape of the plurality of recessed portions G.

The filler layer 600 may be located on the buffer layer 500a. The filler layer 600 may fill the plurality of recessed portions G and/or the spaces of the lower surface of the buffer layer 500a formed to be recessed according to the shape of the plurality of recessed portions G. Thus, in the folding area FA (e.g., the flexible part 430a), the upper surface of the filler layer 600 may have shape (e.g., an uneven shape) corresponding to the shape of the plurality of recessed portions G and/or the buffer layer 500a.

The non-limiting embodiments of FIG. 9 may be substantially the same as or similar to the non-limiting embodiment of FIGS. 6 to 8, apart from the recessed portions G being formed in the second area A2 of the flexible part 430a instead of the holes H, and thus a duplicate description thereof may not be provided.

Figure 10:
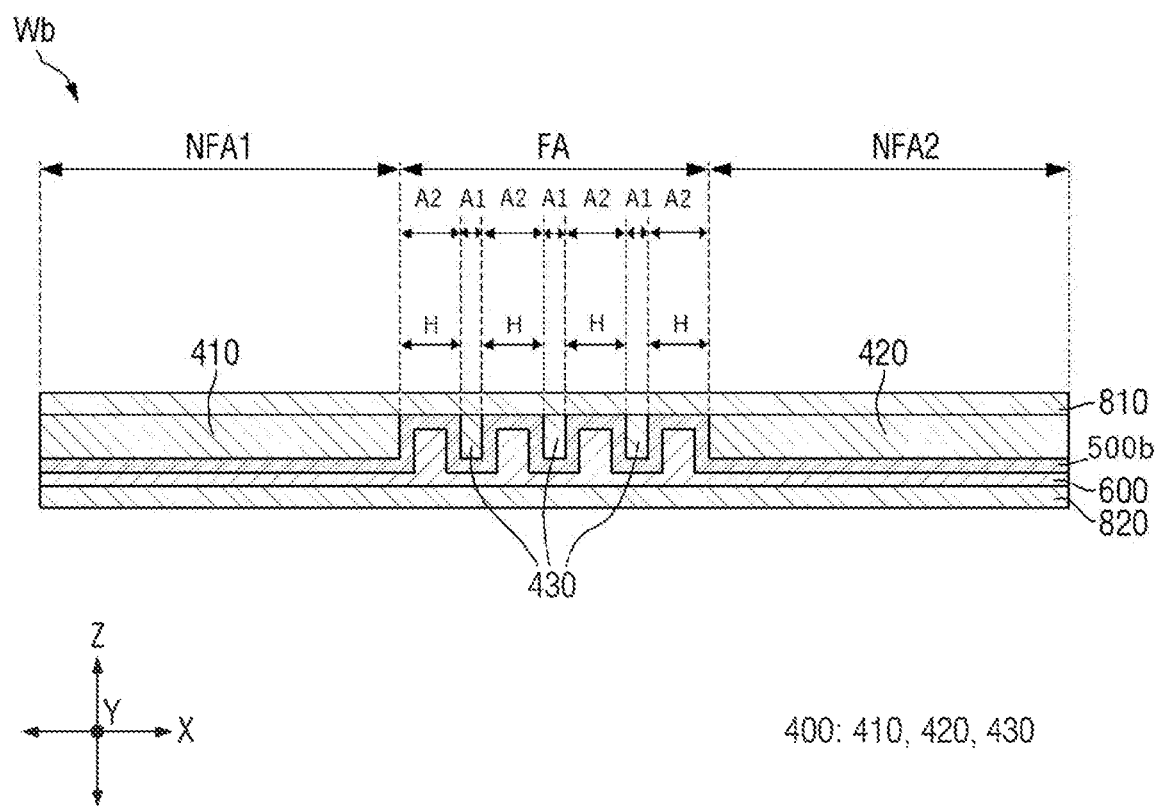
FIG. 10 is a cross-sectional view illustrating a window member, according to some embodiments of the present disclosure.

FIG. 10 is a cross-sectional view illustrating a window member, according to some embodiments of the present disclosure.

The embodiment of FIG. 10 is different from the embodiment of FIGS. 6 to 8 in that a window member Wb further includes at least one of a first thin film glass layer 810 and a second thin film glass layer 820.

Referring to FIG. 10, the window member Wb may further include at least one selected from among the first thin film glass layer 810 and the second thin film glass layer 820.

The first thin film glass layer 810 may be located on an upper surface of a window base material 400. The first thin film glass layer 810 may be located at (e.g., extending across or overlapping with) a first non-folding area NFA1, a folding area FA, and a second non-folding area NFA2. The first thin film glass layer 810 may be located at (e.g., extending across or overlapping with) upper surfaces of a first rigid portion 410, a flexible portion 430, and a second rigid portion 420 of the window base material 400. The first thin film glass layer 810 may be on (e.g. over) a first area A1 and a second area A2 of the flexible portion 430. The first thin film glass layer 810 may cover a plurality of holes H of the flexible portion 430.

A buffer layer 500b may be located between the window base material 400 and a filler layer 600. The buffer layer 500b may be located between the first thin film glass layer 810 and the filler layer 600. For example, the buffer layer 500b may have a thickness (e.g., a set or predetermined thickness) on a lower surface of the first rigid portion 410, an inner surface of each of the plurality of holes H, and a lower surface of the first thin film glass layer 810 in the second area A2. In this case, the buffer layer 500b at the flexible portion 430 may have a shape (e.g., an uneven shape) according to (e.g., corresponding to) the shape of the plurality of holes H.

The second thin film glass layer 820 may be on a lower surface of the filler layer 600. The second thin film glass layer 820 may be located at (e.g., extending across or overlapping with) the first non-folding area NFA1, the folding area FA, and the second non-folding area NFA2.

Each of the first thin film glass layer 810 and the second thin film glass layer 820 may have a thickness that is smaller than (e.g., less than) a thickness of the window base material 400. Each of the first thin film glass layer 810 and the second thin film glass layer 820 may be made of thin film glass or extremely thin and flexible glass (e.g., UTG). The thickness of each of the first thin film glass layer 810 and the second thin film glass layer 820 may be, for example, about 10 μm to about 500 μm, or glass having a thickness of about 200 μm to about 300 μm may be applied. The first thin film glass layer 810 and the second thin film glass layer 820 may each include chemically or thermally strengthened glass.

The first thin film glass layer 810 and/or the second thin film glass layer 820 may reinforce (e.g., may be configured to reinforce) the rigidity of the flexible portion 430 and prevent or reduce deformation or separation of other members due to folding or unfolding of the window base material 400.

The non-limiting embodiment of FIG. 10 may be substantially the same as or similar to the non-limiting embodiments of FIGS. 6 to 8, apart from the window member Wb further including at least one selected from among the first thin film glass layer 810 and the second thin film glass layer 820, and thus a duplicate description thereof may not be provided.

Figure 11:
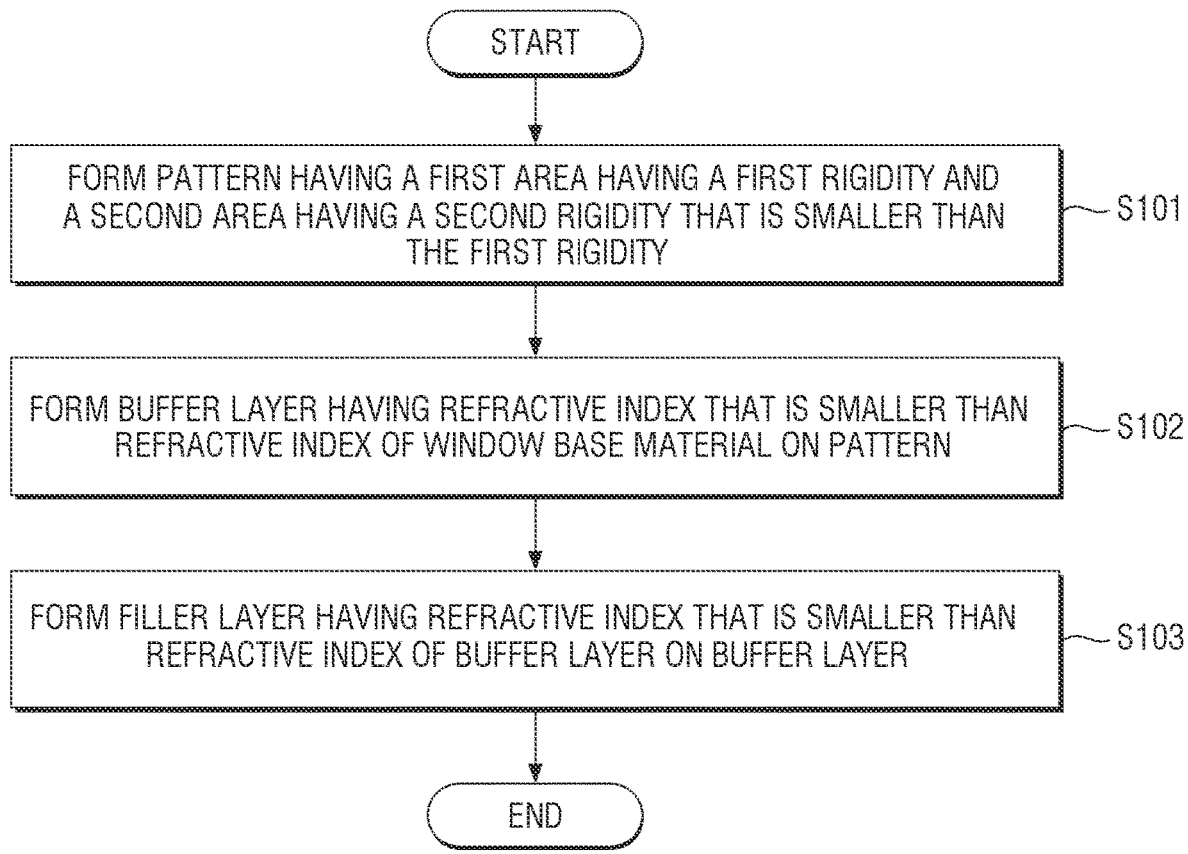
FIG. 11 is a flowchart illustrating a method of manufacturing a display device, according to some embodiments of the present disclosure.

FIG. 11 is a flowchart illustrating a method of manufacturing a display device, according to some embodiments of the present disclosure. FIGS. 12 to 15 are diagrams illustrating operations of the method of manufacturing a display device, according to some embodiments of the present disclosure.

A display device manufactured by the method of manufacturing a display device, which will be described below, may include the display device 1 of FIG. 1. The method of manufacturing a display device may include a method of manufacturing a window member W (see FIG. 15). The window member W' may include (e.g., may be one of) the window members W, Wa, or Wb of FIGS. 6 to 10.

Referring to FIG. 11, the method of manufacturing a display device may include forming a pattern having a first area A1 having a first rigidity and a second area A2 having a second rigidity that is smaller than (e.g., less than) the first rigidity of the first area A1 in a window base material 400' (S101), forming a buffer layer 500' having a refractive index that is smaller than (e.g., less than) a refractive index of the window base material 400' on the pattern (S102), and forming a filler layer 600' having a refractive index that is smaller than (e.g., less than) a refractive index of the buffer layer 500' on the buffer layer 500' (S103).

The forming of the pattern (S101) may include forming a hole H in the second area A2.

The forming of the buffer layer 500' (S102) may include forming the buffer layer 500' on or at an inner surface of the hole H.

The forming of the pattern (S101) may include forming a recessed portion G in the second area A2.

The forming of the buffer layer 500' (S102) may include forming the buffer layer 500' on or at an inner surface of the recessed portion G.

The forming of the buffer layer 500' (S102) may include forming a plurality of layers BF1, BF2, BF3, and BF4 having different refractive indexes.

Hereinafter, the method of manufacturing a display device will be described in more detail with reference to FIGS. 12 to 15. Hereinafter, the window base material 400', the buffer layer 500', and the filler layer 600' of FIGS. 12 to 15 may be the window base material 400, the buffer layer 500, and the filler layer 600 of FIGS. 6 to 8, respectively, but the present disclosure is not limited thereto.

Figure 12:
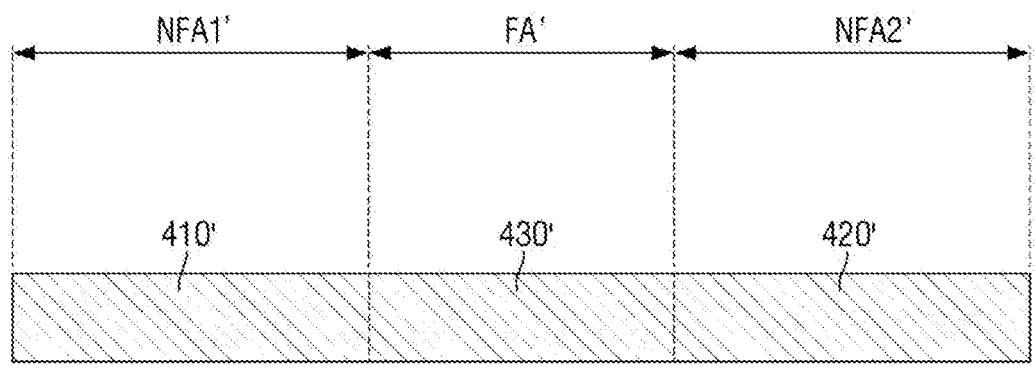
FIGS. 12-15 are diagrams illustrating operations of the method of manufacturing a display device, according to some embodiments of the present disclosure.

Referring to FIG. 12, the window base material 400' may be prepared. The window base material 400' may be made of a transparent material, for example, glass. The window base material 400' of FIG. 12 may be substantially the same as the window base material 400 of FIGS. 6 to 8 before a plurality of holes H are formed therein (e.g., therethrough).

The window base material 400' may be divided into a first processing area NFA1', a second processing area NFA2', and a third processing area FA' between the first processing area NFA1' and the second processing area NFA2'. The third processing area FA' may have an area that is smaller than (e.g., less than) an area of each of the first processing area NFA1' and the second processing area NFA2', but the present disclosure is not limited thereto. The first processing area NFA1', the second processing area NFA2', and the third processing area FA' may correspond to the first rigid portion 410 (e.g., at the first non-folding area NFA1), the second rigid portion 420 (e.g., at the second non-folding area NFA2), and the flexible portion 430 (e.g., at the folding area FA) of FIGS. 6 to 8, respectively.

Figure 13:
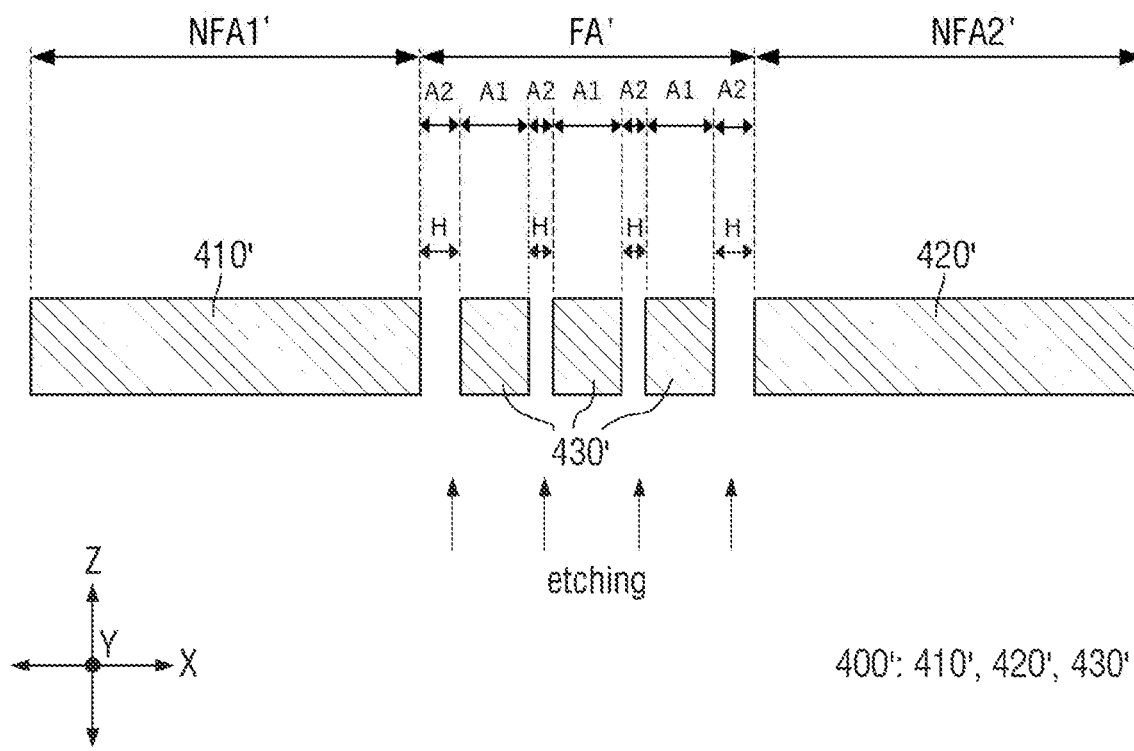

Referring to FIG. 13, the pattern may be formed in the third processing area FA'. The pattern may include the first area A1 having the first rigidity and the second area A2 having the second rigidity that is smaller than (e.g., less than) the first rigidity of the first area A1. The first area A1 may be an area which does not undergo processing, and the second area A2 may be an area in which at least a portion of the window base material 400' is removed (e.g., by etching). In some embodiments, the plurality of holes H may be formed in the second area A2 by an etching process. For example, the etching process may be performed by a wet etching, dry etching, or laser etching process. For example, by the above etching process, a slit pattern (as shown in FIG. 6) may be formed in the third processing area FA'. In some embodiments, a plurality of grooves (e.g., recessed portions) (as shown in FIG. 9) may be formed in the second area A2. In some embodiments, a plurality of holes H may be further formed in the first processing area NFA1' and/or the second processing area NFA2'.

Figure 14:
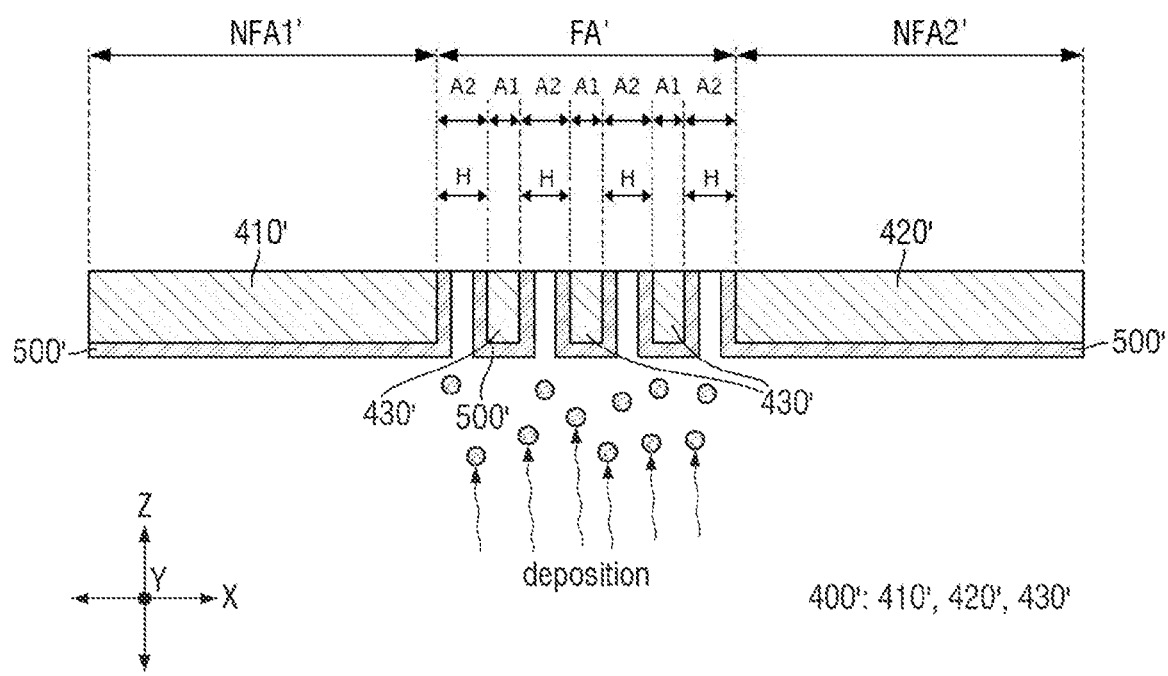

Referring to FIG. 14, after the processing of the window base material 400' is completed, the buffer layer 500' may be formed on one surface of the window base material 400'. The one surface of the window base material 400' may be a lower surface thereof. In some embodiments, the one surface of the window base material 400' may be an upper surface thereof. The buffer layer 500' may have a refractive index that is smaller than (e.g., less than) a refractive index of the window base material 400'. The buffer layer 500' may include at least one selected from among $Na_3AlF_6$, $MgF_2$, $AlF_3$, $LiF_2$, $CaF_2$, $SiO_2$, $Al_2O_3$, $SnO_2$, $Y_2O_3$, MgO, and a combination thereof.

The buffer layer 500' may be formed at (e.g., extending across or overlapping with) the first processing area NFA1', the second processing area NFA2', and the third processing area FA'. The buffer layer 500' may be formed to cover (e.g., to overlap with) a pattern formed by the plurality of holes H. In some embodiments, the buffer layer 500' may be formed in only the third processing area FA'.

The buffer layer 500' may be formed to cover one surface of the window base material 400' and the inner surface of each of the plurality of holes H. Thus, as shown in FIG. 14, the buffer layer 500' may have a cross section in a "L" shape or a "U" shape in which at least one end of the buffer layer 500' is bent (e.g., angled) upward. In some embodiments, as shown in FIG. 9, when the plurality of grooves (e.g., recessed portions G) are formed in the third processing area FA', the buffer layer 500' may be deposited to have a shape (e.g., an uneven shape) on a lower surface of the third processing area FA'.

The buffer layer 500' may be deposited on the window base material 400' (e.g., by a deposition process). For example, the deposition process may be performed by physical vapor deposition or chemical vapor deposition.

In FIG. 14, for convenience of description, one layer is illustrated in the deposition process of the buffer layer 500', but the present disclosure is not limited thereto. As shown in FIG. 8, the plurality of layers BF1, BF2, BF3, and BF4 having different refractive indexes may be deposited (e.g., sequentially deposited) on the window base material 400' to form one buffer layer 500'.

Figure 15:
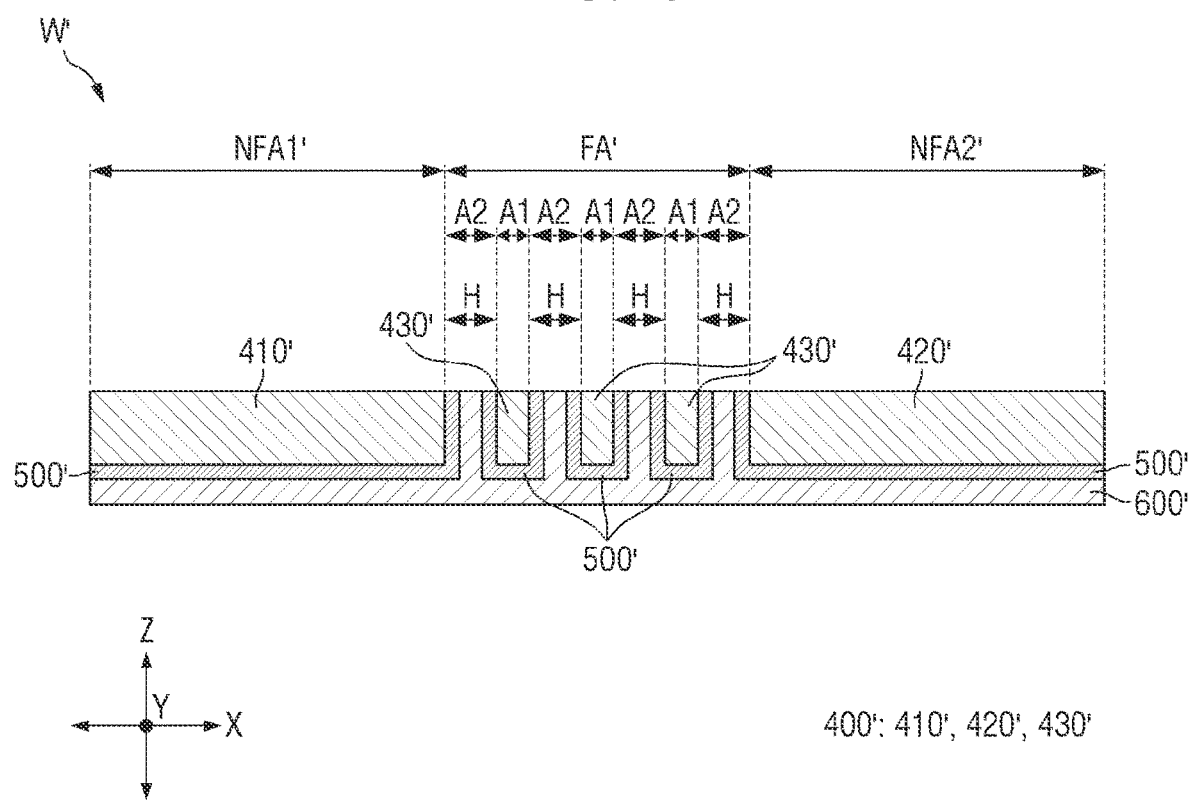

Referring to FIG. 15, the buffer layer 500' may have a refractive index that is smaller than (e.g., less than) the refractive index of the window base material 400' and is greater than a refractive index of the filler layer 600', which will be described below. A refractive index relationship between the window base material 400', the filler layer 600', and the buffer layer 500' is substantially the same as or similar to the refractive index relationship between the window base material 400, the filler layer 600, and the buffer layer 500 of FIG. 8, and thus a duplicate description thereof may not be provided herein.

After the formation of the buffer layer 500' is completed, the filler layer 600' may be formed on the buffer layer 500'. The filler layer 600' may be applied on the buffer layer 500' (e.g., by an application process). For example, the application process may be performed using a coater or a dispenser. In this case, the interiors of the plurality of holes H may be filled with the filler layer 600'. The filler layer 600' may include an acrylic-based, silicone-based, epoxy-based, phenol-based, polyamide-based, or urethane-based resin. Through the above processes, the window member W may be manufactured.

Referring to FIG. 10 again, after the filler layer 600' is applied, the method of manufacturing a display device may further include at least one of forming the first thin film glass layer 810 on the upper surface of the window base material 400' and forming the second thin film glass layer 820 on a lower surface of the filler layer 600'.

Referring to FIG. 4 again, the method of manufacturing a display device may further include bonding the window member W to the display panel 100. For example, the window member W may be bonded to the polarizing member 225 on the display panel 100.

The method of manufacturing a display device is not limited to the above examples, and at least one selected from among the above operations may be omitted or at least one other operation may be added with reference to FIGS. 1 to 10.

In accordance with the present disclosure, a window member, a display device, and a method of manufacturing the display device can reduce the visibility of a pattern formed in a window member.

Herein, the use of the term "may," when describing embodiments of the present disclosure, refers to "one or more embodiments of the present disclosure." As used herein, the term "and/or" includes any and all combinations of one or more of the associated listed items. As used herein, the singular forms "a," "an," and "the" are intended to include the plural forms as well, unless the context clearly indicates otherwise. As used herein, expressions such as "at least one of," "one of," and "selected from," when preceding a list of elements, modify the entire list of elements and do not modify the individual elements of the list. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

As used herein, the phrases such as "a plan view" may refer to a view from top or from a direction normal to a display area of a display device.

As used herein, the terms "use," "using," and "used" may be considered synonymous with the terms "utilize," "utilizing," and "utilized," respectively.

Spatially relative terms, such as "beneath," "below," "lower," "above," "upper," "bottom," "top," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (e.g., rotated 90 degrees or at other orientations), and the spatially relative descriptors used herein should be interpreted accordingly.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present disclosure, and should not be interpreted in an idealized or overly formal sense, unless expressly so defined herein.

In concluding the detailed description, those of ordinary skill in the art will appreciate that many suitable variations, modifications, additions, and substitutions can be made to the various embodiments of the present disclosure without substantially departing from the spirit and scope of the present disclosure as defined by the accompanying claims and equivalents thereof. Therefore, the disclosed embodiments of the disclosure are used in a generic and descriptive sense only and not for purposes of limitation.

What is claimed is:

1. A display device comprising:
   a display panel; and
   a window member on the display panel,
   wherein the window member comprises:
      a window base material comprising a flexible portion in which a first area having a first rigidity and a second area having a second rigidity that is less than the first rigidity are alternately located; and
      a buffer layer located between the window base material and a filler layer, and having a refractive index that is less than a refractive index of the window base material and greater than a refractive index of the filler layer, such that a visibility of a pattern of the flexible portion is reduced.

2. The display device of claim 1, wherein:
   the second area comprises a plurality of holes passing through the window base material; and
   at least a portion of the buffer layer is at an inner surface of each of the plurality of holes.

3. The display device of claim 1, wherein:
   the second area comprises a plurality of recessed portions; and
   at least a portion of the filler layer is located to fill the plurality of recessed portions.

4. The display device of claim 1, wherein the window base material comprises:
   a first rigid portion at one side of the flexible portion; and
   a second rigid portion at another side of the flexible portion,
   wherein the first area is made of a same material as the first rigid portion and the second rigid portion.

5. The display device of claim 4, wherein the filler layer overlaps with the first rigid portion, the second rigid portion, and the flexible portion.

6. The display device of claim 1, wherein a difference between the refractive index of the filler layer and the refractive index of the buffer layer is less than or equal to about 0.003.

7. The display device of claim 1, wherein the refractive index of the buffer layer is between about 1.3 and about 1.6.

8. The display device of claim 1, wherein the buffer layer comprises a plurality of layers having different refractive indexes.

9. The display device of claim 8, wherein the refractive indexes of the plurality of layers increase in a direction from the filler layer toward the window base material.

10. The display device of claim 8, wherein a thickness of each of the plurality of layers is from about ¼ to about ½ of a wavelength of incident light incident on the buffer layer.

11. The display device of claim 1, wherein the buffer layer comprises at least one of $Na_5AlF_6$, $MgF_2$, $AlF_3$, $LiF_2$, $CaF_2$, $SiO_2$, $Al_2O_3$, $SnO_2$, $Y_2O_3$, or $MgO$.

12. A window member comprising:
a window base material comprising a flexible portion in which a first area having a first rigidity and a second area having a second rigidity that is less than the first rigidity are alternately located; and
a buffer layer located between the window base material and a filler layer, and having a refractive index that is less than a refractive index of the window base material and greater than a refractive index of the filler layer, such that a visibility of a pattern of the flexible portion is reduced.

13. The window member of claim 12, wherein:
the second area comprises a plurality of holes passing through the window base material; and
at least a portion of the buffer layer is at an inner surface of each of the plurality of holes.

14. The window member of claim 12, wherein:
the second area comprises a plurality of recessed portions; and
at least a portion of the filler layer is located to fill the plurality of recessed portions.

15. The window member of claim 12, wherein
the buffer layer comprises a plurality of layers having different refractive indexes.

16. A method of manufacturing a display device, the method comprising:
forming a pattern comprising a first area having a first rigidity and a second area having a second rigidity that is less than the first rigidity in a window base material; and
forming a buffer layer between the window base material and a filler layer, the buffer layer having a refractive index that is less than a refractive index of the window base material and greater than a refractive index of the filler layer, such that a visibility of the pattern is reduced.

17. The method of claim 16, wherein the forming of the pattern comprises forming a hole in the second area.

18. The method of claim 17, wherein the forming of the buffer layer comprises forming the buffer layer at an inner surface of the hole.

19. The method of claim 16, wherein the forming of the pattern comprises forming a recessed portion in the second area.

20. The method of claim 19, wherein the forming of the buffer layer comprises forming the buffer layer at an inner surface of the recessed portion.

\* \* \* \* \*